Oct. 5, 1943. H. L. GRIFFIN ET AL 2,330,967
MACHINE FOR PROCESSING FOOD PRODUCTS
Filed Dec. 2, 1939 12 Sheets-Sheet 1
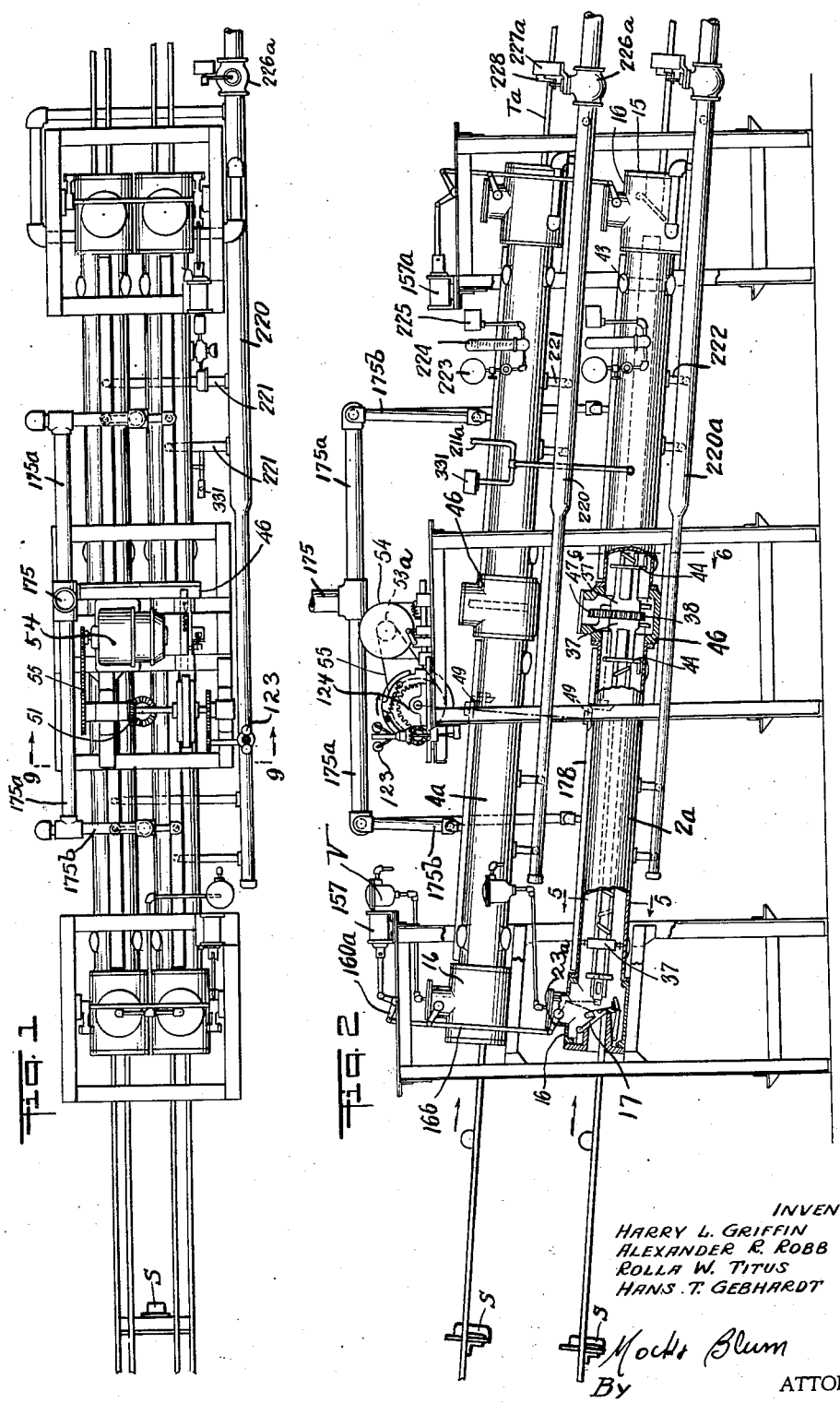
INVENTORS
HARRY L. GRIFFIN
ALEXANDER R. ROBB
ROLLA W. TITUS
HANS T. GEBHARDT
By Mocks Blum
ATTORNEYS

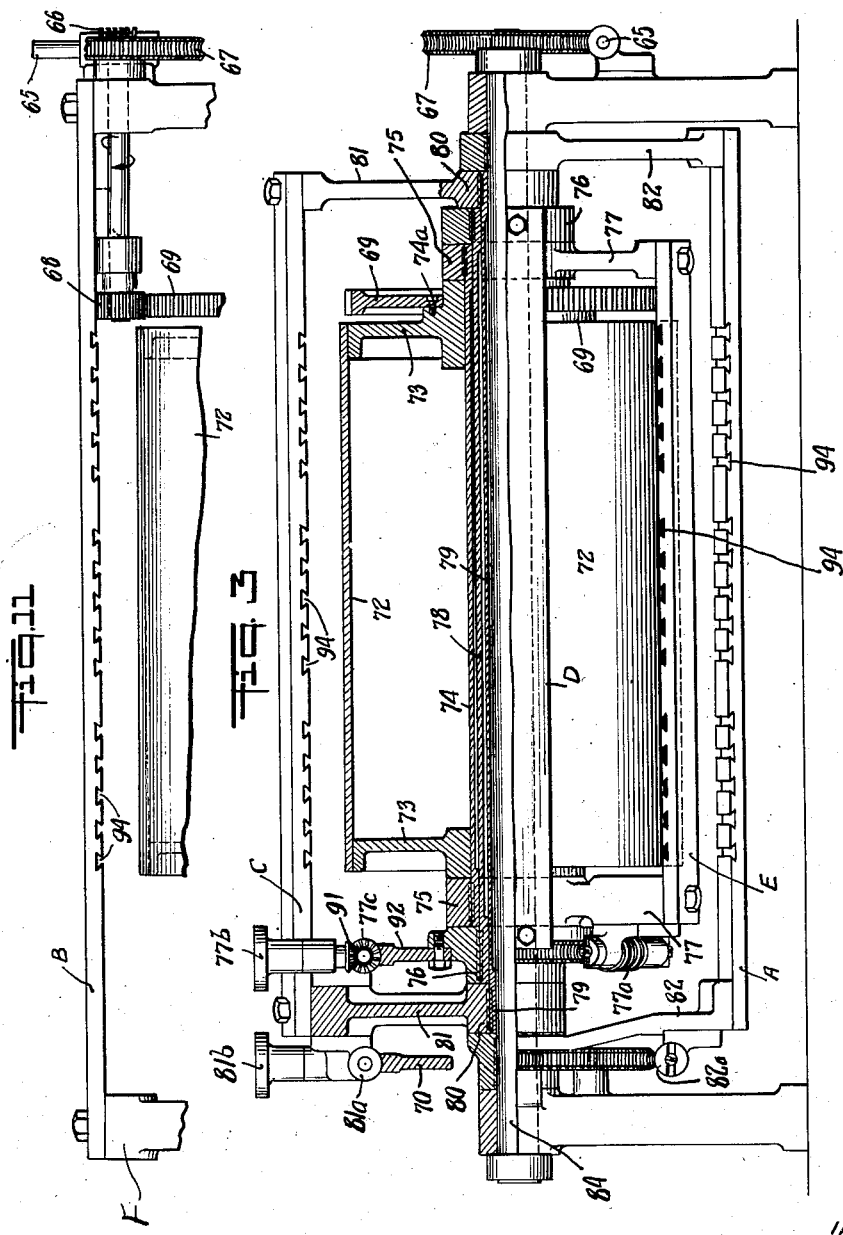

Oct. 5, 1943.   H. L. GRIFFIN ET AL   2,330,967
MACHINE FOR PROCESSING FOOD PRODUCTS
Filed Dec. 2, 1939   12 Sheets-Sheet 3
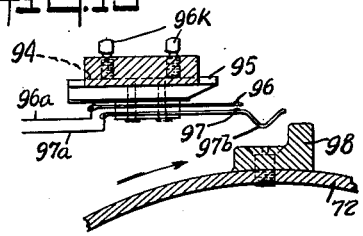
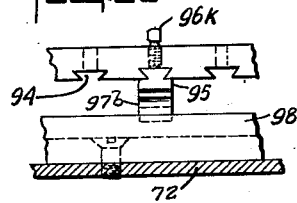
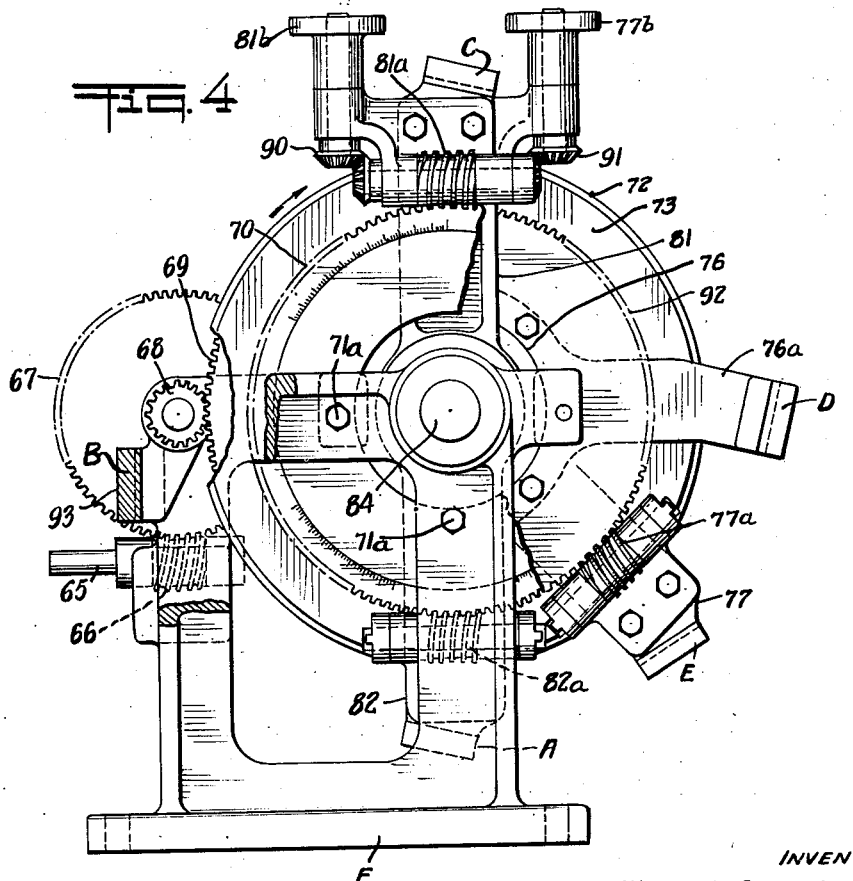
INVENTORS
HARRY L. GRIFFIN
ALEXANDER R. ROBB
ROLLA W. TITUS
HANS T. GEBHARDT
BY Mockler Blum
ATTORNEYS Oct. 5, 1943. H. L. GRIFFIN ET AL 2,330,967
MACHINE FOR PROCESSING FOOD PRODUCTS
Filed Dec. 2, 1939 12 Sheets-Sheet 4
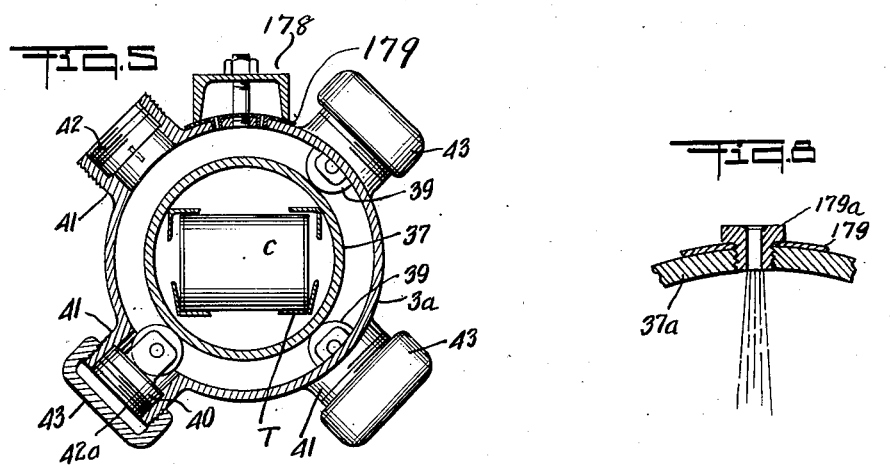
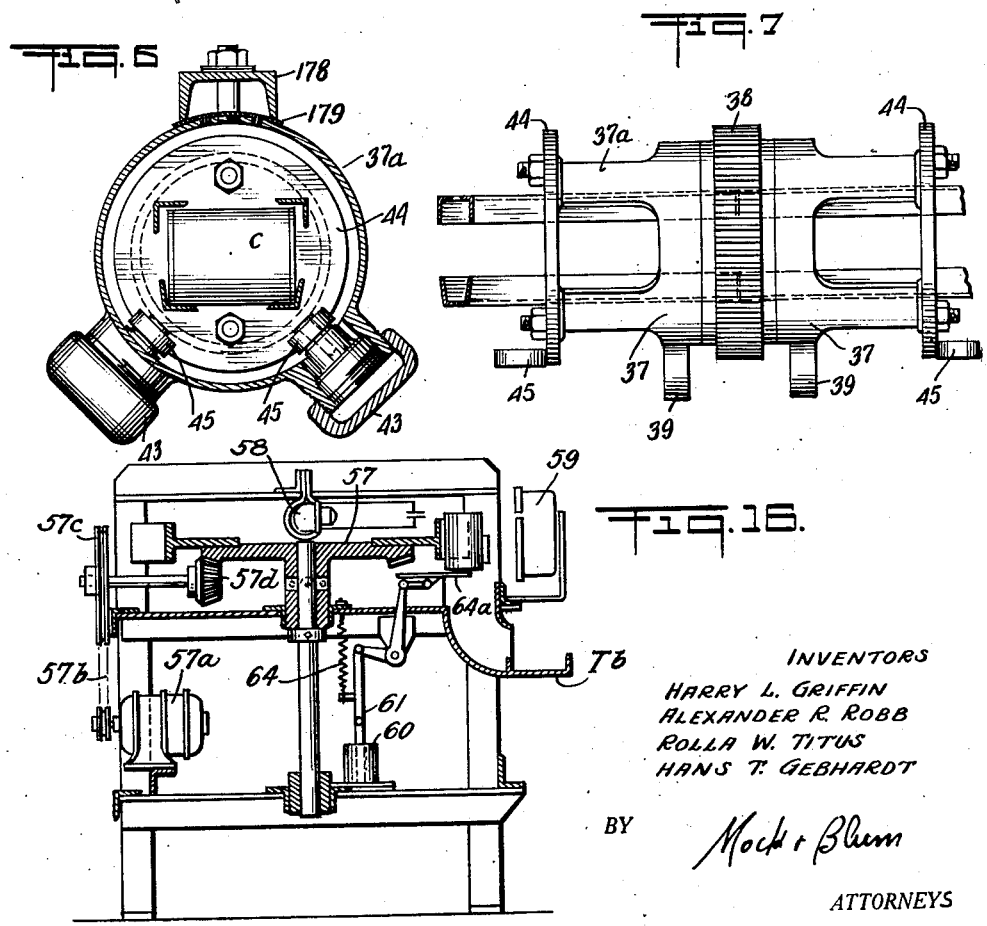
INVENTORS
HARRY L. GRIFFIN
ALEXANDER R. ROBB
ROLLA W. TITUS
HANS T. GEBHARDT
BY Mock & Blum
ATTORNEYS

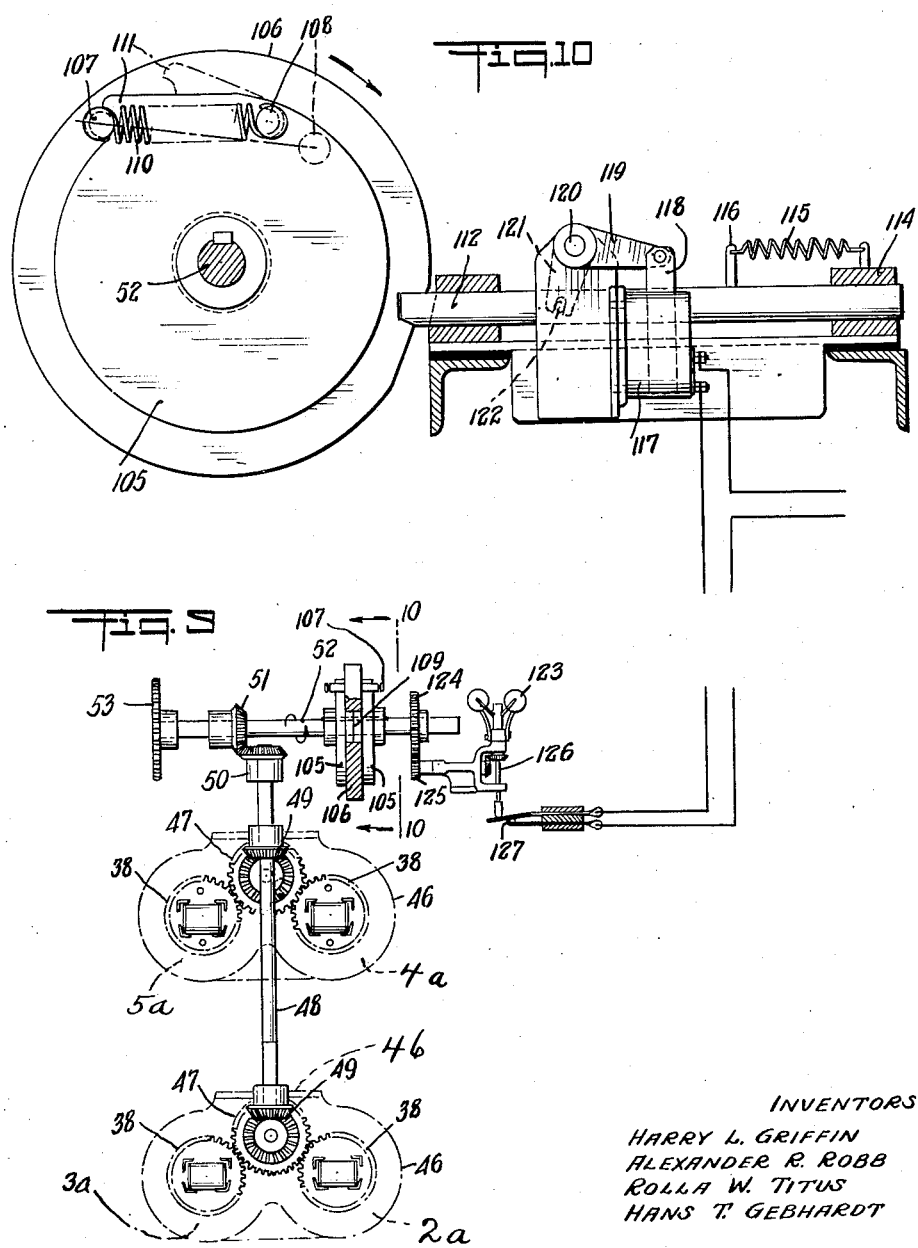

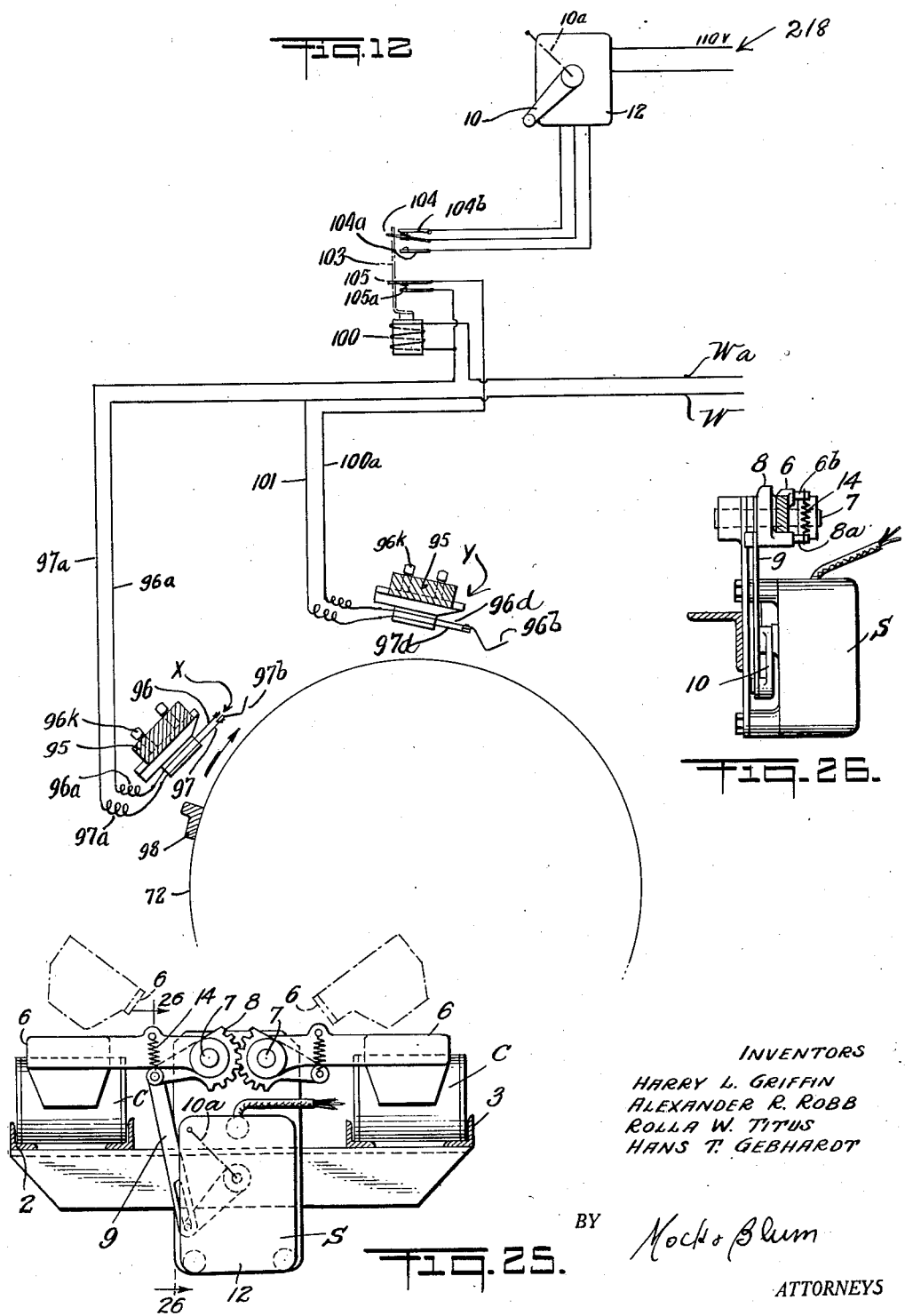

Oct. 5, 1943.                H. L. GRIFFIN ET AL                    2,330,967
                        MACHINE FOR PROCESSING FOOD PRODUCTS
                          Filed Dec. 2, 1939           12 Sheets-Sheet 7
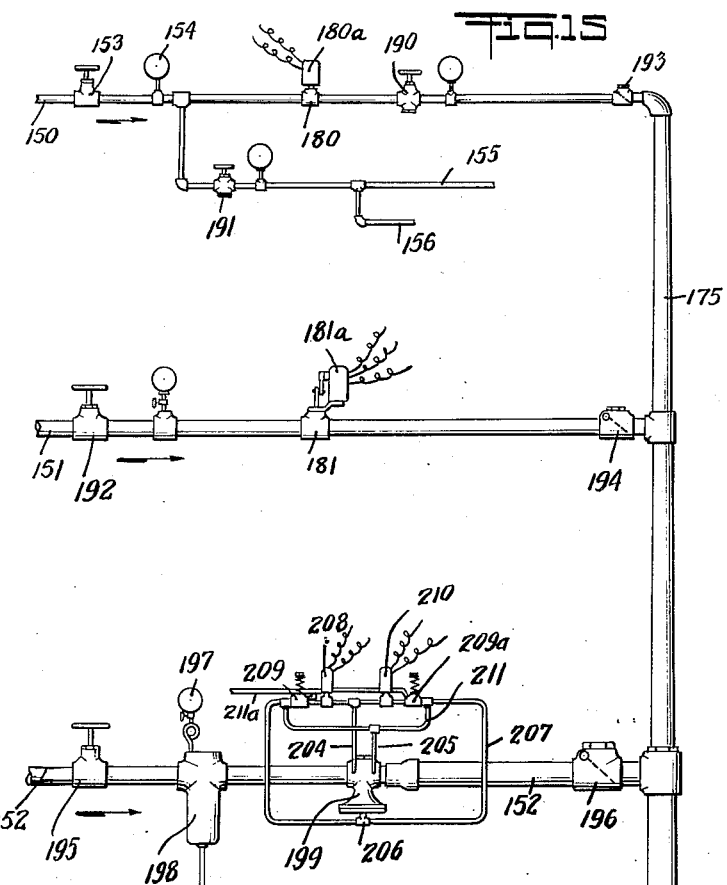
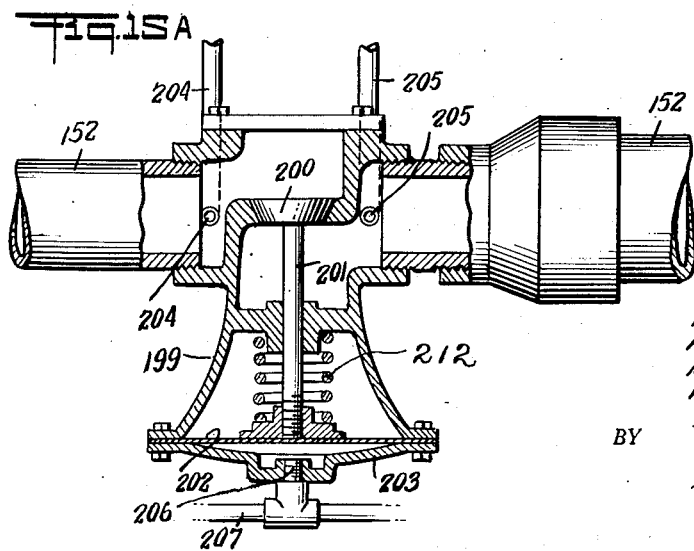
INVENTORS
HARRY L. GRIFFIN
ALEXANDER R. ROBB
ROLLA W. TITUS
HANS T. GEBHARDT
BY
ATTORNEYS

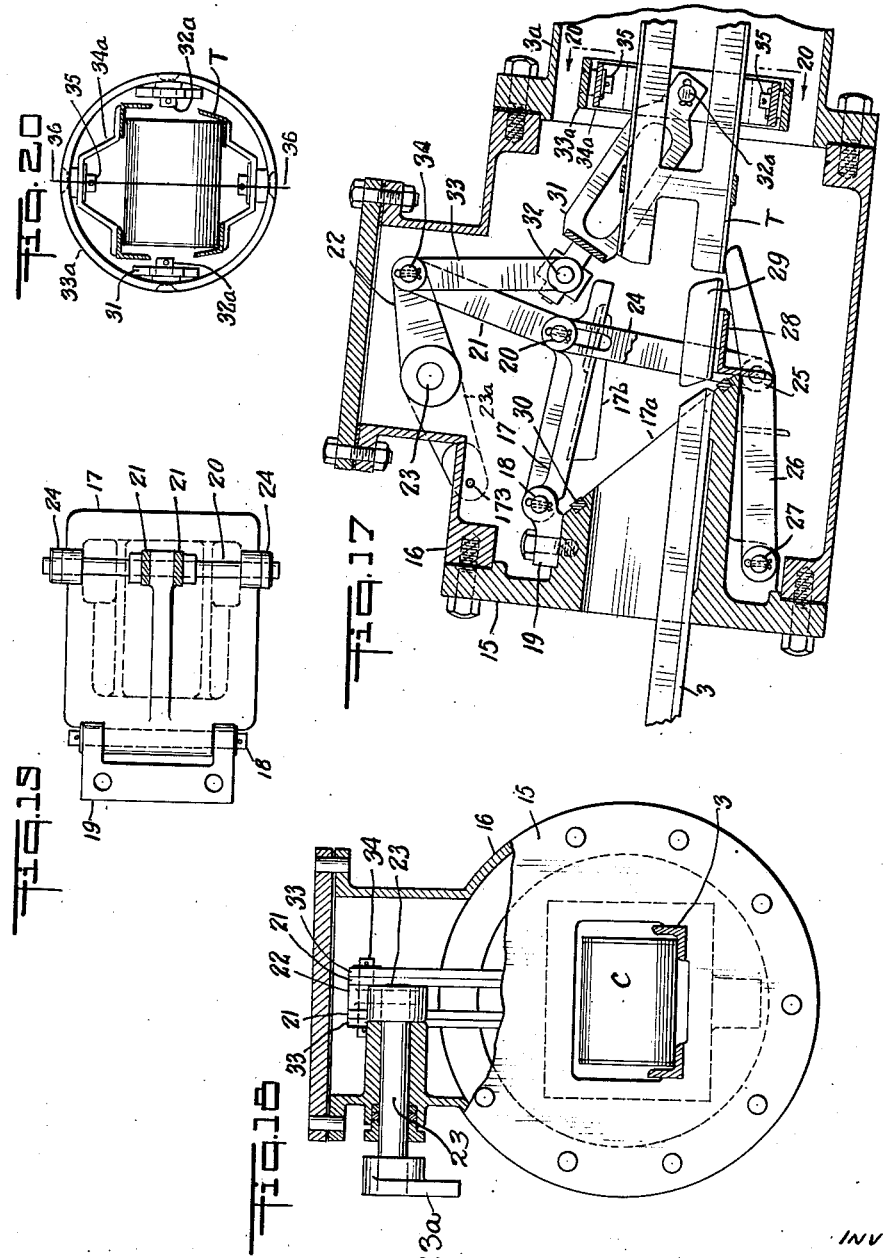

Oct. 5, 1943.  H. L. GRIFFIN ET AL  2,330,967
MACHINE FOR PROCESSING FOOD PRODUCTS
Filed Dec. 2, 1939  12 Sheets-Sheet 9
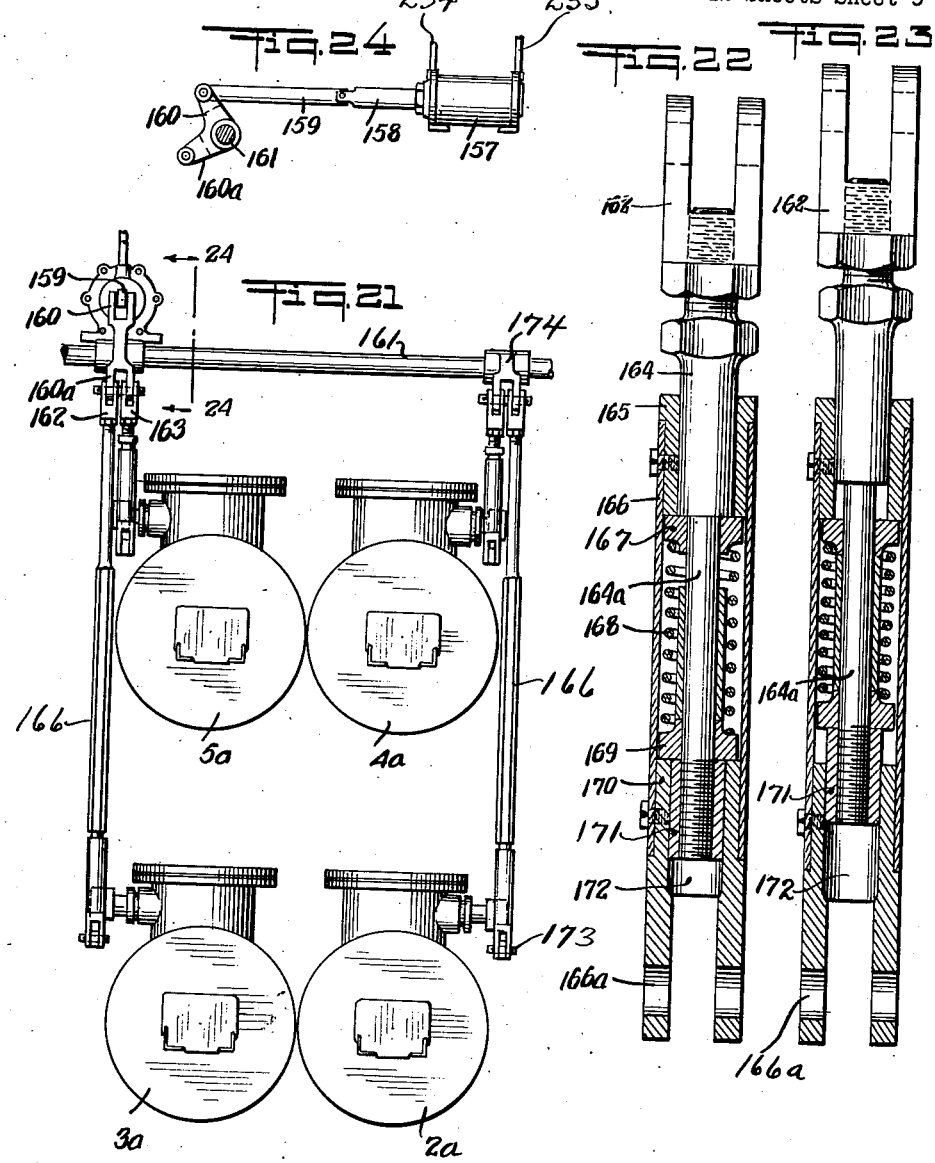
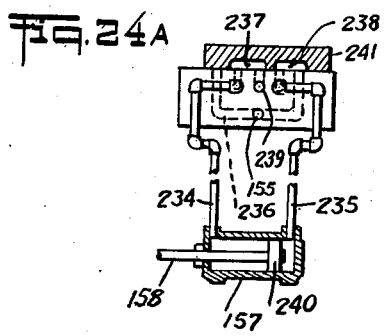
INVENTORS
HARRY L. GRIFFIN
ALEXANDER R. ROBB
ROLLA W. TITUS
HANS T. GEBHARDT
BY
ATTORNEYS

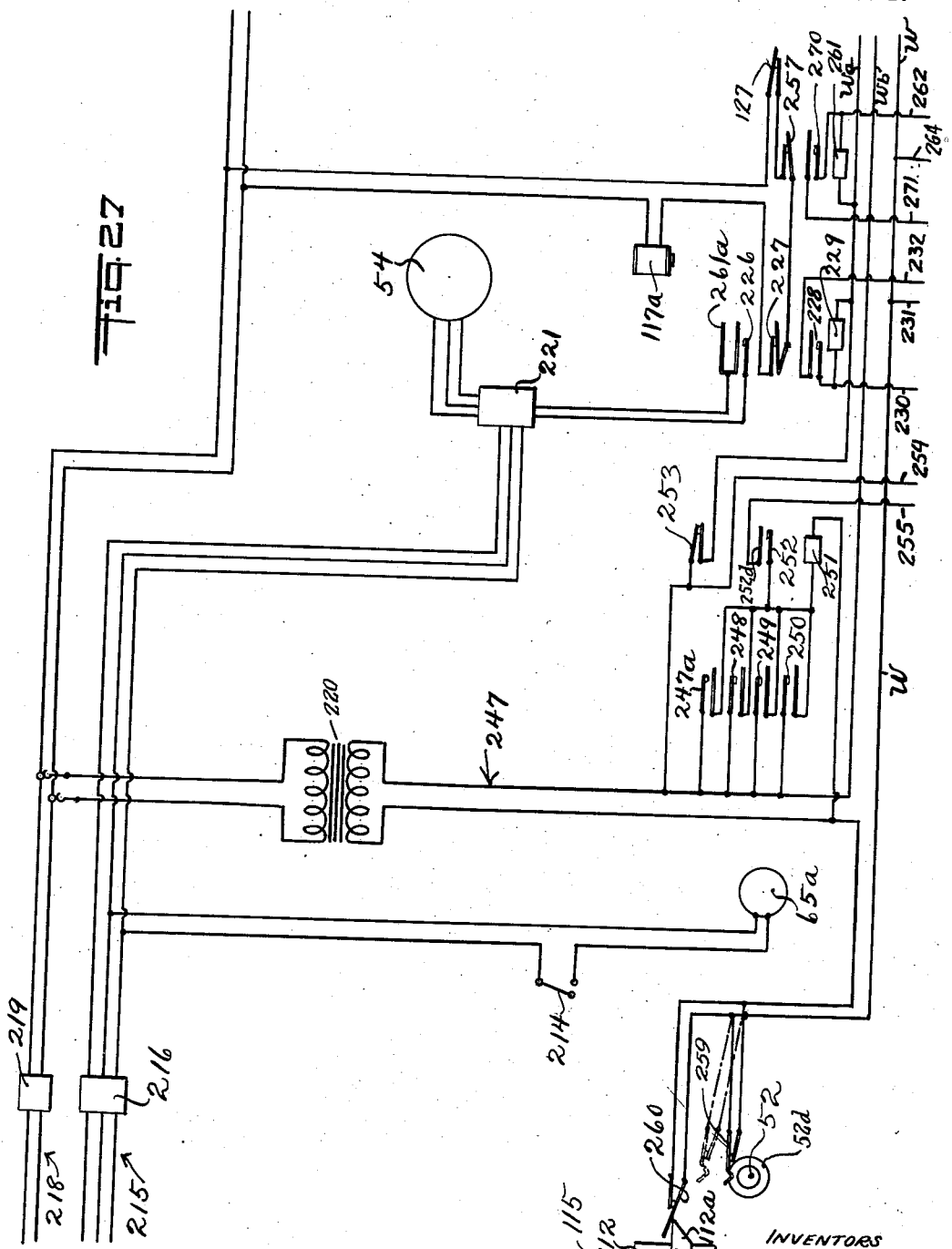

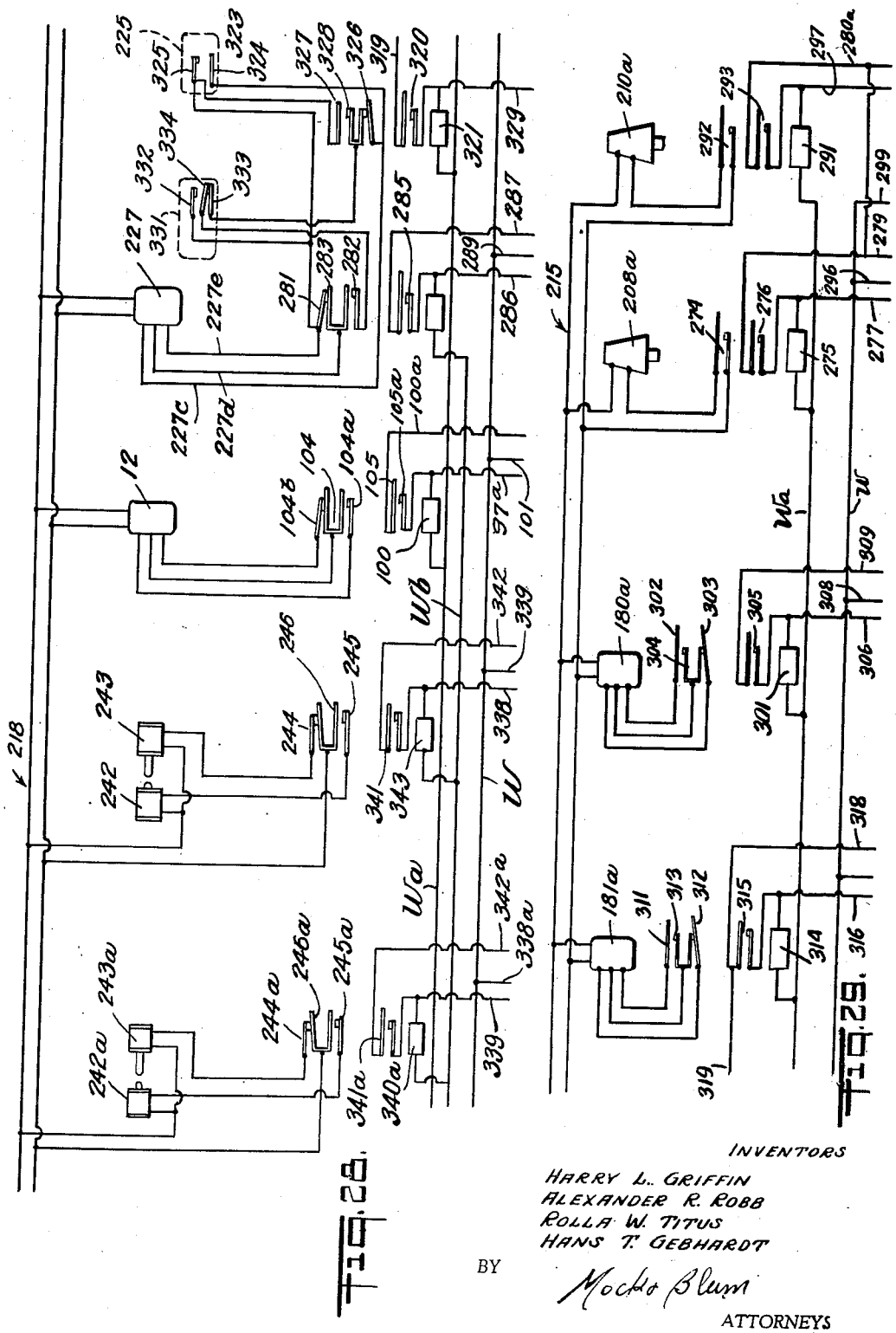

Oct. 5, 1943.  H. L. GRIFFIN ET AL  2,330,967
MACHINE FOR PROCESSING FOOD PRODUCTS
Filed Dec. 2, 1939  12 Sheets-Sheet 12
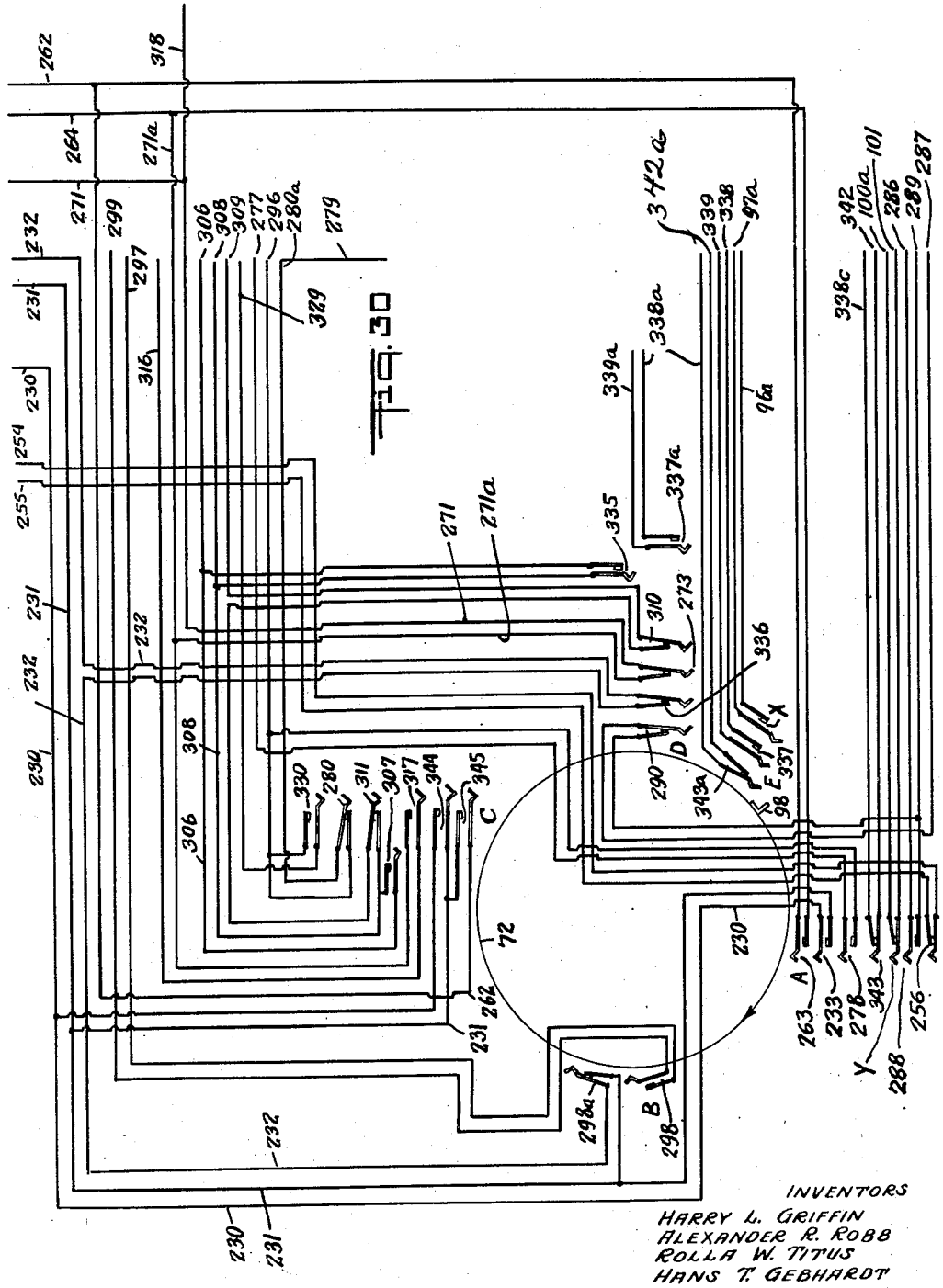
INVENTORS
HARRY L. GRIFFIN
ALEXANDER R. ROBB
ROLLA W. TITUS
HANS T. GEBHARDT
BY  Mock & Blum
ATTORNEYS Patented Oct. 5, 1943

2,330,967

UNITED STATES PATENT OFFICE 2,330,967

MACHINE FOR PROCESSING FOOD PRODUCTS

Harry L. Griffin, Rockville Centre, and Alexander R. Robb, Valley Stream, N. Y., and Rolla W. Titus and Hans T. Gebhardt, Marysville, Ohio, assignors to Nestle's Milk Products, Inc., New York, N. Y., a corporation of New York Application December 2, 1939, Serial No. 307,244

21 Claims. (Cl. 126—272)

Our invention relates to a new and improved machine for processing food products.

One of the objects of our invention is to provide an improved machine for treating canned milk, and more particularly to sterilize canned milk.

Another object of the invention is to provide a machine which will have one or more series or sets of casings. Each said series of casings may include any desired number of casings. The improved machine automatically supplies the cans to each said series of casings, and the casings are then closed while various operations are performed on the cans of milk which are located therein. At the completion of the processing operation, the casings of each series are automatically opened, and the cans are automatically discharged from the same. By having a sufficient number of sets of casings, the machine will operate continuously, although the cans are treated in batches. Air or water or steam will always be supplied to one or more of the sets of casings.

Another object of our invention is to provide an improved control unit whereby all the operations are performed automatically, said control unit being conveniently adjustable so as to allow for variations in the respective batches of canned milk.

Another object of our invention is to provide a control unit which can be used for controlling any desired number of series of casings so that the machine will operate continuously to receive and to discharge cans, if desired, although the cans of milk are supplied intermittently to the respective sets of casings.

Other objects of our invention will be set forth in the following description and drawings which illustrate a preferred embodiment thereof.

Fig. 1 is a top plan view of the improved machine.

Fig. 2 is a side elevation of Fig. 1.

Fig. 3 is a longitudinal section, partially in elevation, showing the main control unit for the machine.

Fig. 4 is an end view taken at the left-hand side of Fig. 3.

Fig. 5 is a sectional view, partially in elevation, on the line 5—5 of Fig. 2.

Fig. 6 is a sectional view, partially in elevation, on the line 6—6 of Fig. 2.

Fig. 7 is an enlarged detail view, showing the gear means which rotate in unison with the tracks of the respective casings, and which serve as means for rotating the tracks.

Fig. 8 is an enlarged detail view, showing the spray-head which is used in the respective casings for projecting steam and also for projecting cooling water upon the cans and also between the cans which are located in the closed casings. This spray-head is also used for admitting air into the casings.

Fig. 9 is an enlarged diagrammatic view, showing the mechanism for rotating the respective sets of tracks in the respective casings about the respective axes of said casings.

Fig. 10 is a sectional view, partially in elevation, on the line 10—10 of Fig. 9.

Fig. 11 is a partial top plan view of the left-hand side of Fig. 4.

Fig. 12 represents one of the control sub-units which can be used in connection with the main control unit which is shown in Fig. 3.

Fig. 13 is a detail view showing one of the elements of the control unit, including a control switch.

Fig. 14 is an end view taken at the right-hand side of Fig. 13.

Fig. 15 is a detail view of the respective pipe lines which are connected to sources of water, air and steam, together with the control mechanism and the common header for said respective pipe lines.

Fig. 15A is a detail of the pressure-regulating means of the steam valve system which is shown in Fig. 15.

Fig. 16 is a sectional view, partially in elevation, showing the electric-eye means for detecting and rejecting bulged cans.

Fig. 17 is a side elevation, partially in section, showing one of the valves which serve either as inlet valves or outlet valves, and which are located at each end of each casing of the apparatus. Fig. 17 shows said valve in the open position.

Fig. 18 is an end elevation, partially in section, taken at the left-hand side of Fig. 17.

Fig. 19 is a detail top plan view of the closure flap of the valve of Fig. 17, including the hinge for said flap.

Fig. 20 is a sectional view, partially in elevation, on the line 20—20 of Fig. 17.

Fig. 21 is a detail view of the mechanism for opening and closing the inlet and outlet valves of the respective casings.

Fig. 22 is a detail view of the composite link which is one of the elements shown in Fig. 21.

Fig. 23 is the same as Fig. 22, save that Figs. 22 and 23 show different relative positions of the parts of said composite link.

Fig. 24 is a detail view of the piston-type motor for operating said inlet valves and said outlet valves.

Fig. 24A diagrammatically shows the valve for controlling the admission of air to either end of the cylinder of said piston-type motor.

Fig. 25 is a detail view of the mechanism for controlling the movement of the cans on the tracks so as to admit the proper number of cans into each casing.

Fig. 26 is a detail section on the line 26—26 of Fig. 25.

Figs. 27–30 show a complete diagram of the circuits of the control unit.

In this embodiment, only a single set of casings is illustrated, as the illustration of additional sets would be mere duplication.

The filled and soldered cans are delivered to the respective tubular casings 2a, 3a, 4a and 5a, by means of conventional downwardly-inclined tracks which have control-stops. Each track has longitudinally spaced pairs of movable stops S. Each track is first filled with cans up to its respective anterior pair of stops S. Said anterior stops are then moved to inoperative position, so that each track can receive the cans up to its second pair of stops. The anterior stops are then moved back to operative position, and the posterior stops are then moved to inoperative position. These stops are operated by identical mechanism, which is shown in Fig. 25.

As shown in Fig. 25, the stop-arms 6 are arranged and operated in pairs. The stop-arms 6a are similarly arranged and operated. In Fig. 25, the full-line positions of arms 6 indicate their operative positions, and the broken-line positions of said arms indicate their inoperative positions. Fig. 25 shows the cans C which are respectively located on the tracks 2 and 3, which supply cans to the casings 2a and 3a. Each track has a U-shaped cross-section so that the cans can slide or roll relative to the tracks. The stop-arms 6 are mounted freely on respective shafts 7. These shafts 7 have gear-sectors 8 keyed thereto and said gear sectors 8 intermesh. One of said sectors 8 is pivotally connected to a link 9 which is pivotally connected to the arm 10 of the armature shaft 11 of an electric motor 12. Said arm 10 can be connected directly to said shaft, or by speed-reduction gears. This motor 12 is of a conventional and well-known type which is used for opening and closing valves. It has two circuits which can be respectively energized for turning the motor shaft in respective opposite directions. When the motor shaft has been turned through a predetermined arc, internal automatic means which are provided as an accessory to the motor, open the respective operating circuit. These motors are shaded-pole reversing motors which have integral transformers. They are known commercially as type "M" motors, made by Automatic Temperature Control Inc. of New York, N. Y. When one of the circuits of this motor 12 is energized so as to turn its shaft in one direction, the arm 10 is turned from the lower position shown in Fig. 25 to the upper position which is shown by means of a broken line 10a and said motor 12 is then automatically stopped. Upon reversing said motor 12 by energizing its other circuit, the arm 10 is turned back from the position 10a, to the bottom position shown in Fig. 25, and said other circuit is then opened. The automatic means which we have provided for controlling motor 12 are shown in Fig. 12, and said automatic means are later described. As shown in Fig. 26, each stop-arm 6 rests upon a lug of the respective sector 8. Each stop-arm 6 has a spring 14 connected to a lug 6b thereof and to a lug 8a of the associated sector 8. This provides a yielding free movement between each stop-arm 6 and its sector 8 so that the cans are not damaged if, when the arms 6 are moved to their operative positions, said arms contact with cans C.

The cans are transferred to the respective casings through inlet-valves, one of which is shown in Fig. 17 in the open position. Each casing 2a, 3a, 4a and 5a has one of said inlet-valves.

The inlet-valve shown in Fig. 17 has a valve-casing 15, part of which is located in a head 16, which abuts an annular flange of the associated casing. Fig. 17 shows the inlet-valve of the casing 3a.

The valve includes a valve-flap 17 which is pivotally mounted at 18 to a hinge-member 19 which is rigidly secured to the casing 15. The valve-flap 17 is pivotally connected by transverse pivot-rod 20, which is also shown in Fig. 19, to links 21 which are pivotally connected to rock-arms 22 which are keyed to a rock shaft 23. Additional links 24 are pivotally connected at 25 to arms 26 which are pivotally connected at 27 to the casing 15. The links 21 and 24 are freely turnable relative to pivot-rod 20.

The arms 26 are rigidly connected to a transverse angular member 28 which supports a supplemental track-section 29 of the track 3. This track-section 29 bridges the gap between the track 3 and the rails T of its associated casing 3a, when the valve-flap 17 is in the open position shown in Fig. 17. When the valve-flap 17 is in the closed position, the track-section 29 is depressed from the position shown in Fig. 17. The closed position of the valve 17 is indicated by the line 17a in Fig. 17. It is therefore necessary to lower the track-section 29 in order to allow the valve-flap 17 to move to the closed position. The valve-seat of the valve-casing 15 is provided with the usual gasket 30, for providing a steam-tight and air-tight closure when valve-flap 17 abuts said gasket. The respective valve-mechanisms are of identical construction and they are opened and closed in proper timed relation by a single control unit. The underside of the valve-flap 17 is provided with lugs 17b which act as a guide for the tops of the cans when they move off the tracks 3, over track-section 29, to the rails T of the associated casing.

When the stop-arms 6a of any of the tracks are moved to their inoperative positions, and the stop-arms 6 are held in the "stop" position, the valve-flap 17 of the respective casing is also opened and a predetermined number of cans roll by gravity to the rails T of the respective casing.

As shown in Figs. 2 and 17, the common longitudinal axis of the casing 3a and of its rails T is also downwardly inclined so that the cans C fill the rails T of the respective casing under the force of gravity. These casings 2a, 3a, 4a, 5a and their associated parts are identical. Each said casing has an outlet valve which is identical with said inlet valve.

Each of the four casings 2a—5a is maintained stationary, but the downwardly inclined rails T of each casing are turned relative to the downwardly inclined axis of the respective casing.

Each inlet valve is provided with a pair of closure members 31 which close the inlet ends of the tracks of the respective casings, when the valve-flap 17 is closed. Each closure member 31 is connected by means of a ball-and-socket joint 32, to a link 33 which is pivotally connected at 34 to the rock arm 22. Hence, when the respective members 31 are in the operative or closing position, they are aligned with rails T and they can turn in unison with the rails T relative to the longitudinal axis of the respective casing, by means of the universal ball-and-socket joint 32.

The casings of the inlet-valves and of the outlet-valves have conventional vent-valves V.

Fig. 20 shows the four angular tracks or rails T of the casing 3a.

As shown in Fig. 17, each closure member 31 is pivotally connected by pins 32a to a ring 33a. Each of the brackets 34a is connected to a pair of the rails T and each of these brackets 34a is connected by a pivot 35 to the ring 33a. The ring 33a can turn relative to the brackets 34a, by means of the pivots 35, about an axis which is defined by the line 36—36 in Fig. 20. Each closure member 31 can turn relative to the respective ring 33a, about the pivots 32a, around an axis which is perpendicular to the axis defined by said line 36—36. Therefore, when the rails T turn in unison with the associated brackets 34a and the associated ring 33a, around the longitudinal axis of the respective casing, there is a relative free motion between the ring 33a and said associated rails T, so that if a closure member 31 is not in the predetermined position when the associated rails T are rotated, there is no tendency to open the respective valve-flap 17. This makes it unnecessary to have the links 33 of precisely the correct length. The rails T are connected by any suitable lateral truss members in order to provide a strong and rigid assembly.

As shown in Fig. 2, the four rails T of each casing 2a–5a are connected to each other at suitable spaced intervals, by means of spaced collars 37. One of these collars can be located at the rear end of each set of rails T.

As shown in Figs. 5 and 20, the rails T are of angular cross-section. Two of said rails T of each set have cross-sectional angles of 90° and the other two rails of each set have cross-sectional obtuse angles. This provides allowance for a defective or bulging can without allowing any substantial relative lateral movement between the cans and the rails, when the rails in a casing are rotated about their common longitudinal axis. If one or more of the rails T did not have said obtuse angles it would be necessary to provide a loose fit between the cans and the rails, in order to make allowance for bulged cans. During the period of agitation, this loose fit would permit some free lateral movement between perfect cans and the rails, whereby the cans would slap in the rails, thus producing considerable foam in the milk. This foam is highly objectionable because it hinders proper heat transfer and the presence of foam would produce various objectionable characteristics in the processed milk.

As shown in Fig. 5, each ring or collar 37 is held spaced from the inner wall of the associated casing, by a series of anti-friction rolls 39. Each anti-friction roll 39 is turnably connected to a head 40. There is a slight clearance between collars 37 and rolls 39. Referring to Fig. 17, when the valve-flaps 17 are opened, arms 26 strike tracks T so as to jar said tracks. The outlet valves are then open. If any cans remain in a casing, this jar will cause the cans to roll out of the casing. Each casing is provided with radial projections 41, whose inner walls have shoulders. Said inner walls are threaded at 42. The inner end of each head 40 abuts the shoulder of the inner wall of the respective projection 41. A threaded plug 42a holds each head 40 in position. Each projection 41 is provided with a cap 43.

Fig. 7 shows the ring gear 38 in detail. The collars 37 which are located adjacent the ring gear 38, are provided with longitudinal arms 37a which are connected to thrust collars 44. Rolls 45 are suitably turnably connected to the inner wall of the associated casing and these rolls 45 abut the respective opposed faces of the thrust-collars 44, so as to prevent any longitudinal movement of the rails T, relative to the respective casing. The collars 37 are suitably fixed to the ring gears 38.

Referring to Fig. 9, the four casings 2a–5a are arranged in pairs, each pair having a common closed header 46, which is also shown in Fig. 2. The gears 38 are arranged in pairs and each pair of gears 38 meshes with a drive gear 47, which is located in said header. The drive shaft 48 has bevel gears 49 which mesh with corresponding bevel gears on the shafts of the drive gears 47. The drive shaft 48 also has a bevel gear 50 which meshes with the bevel gear 51 of a shaft 52. The tracks of the respective casings are turned a single revolution for each revolution of shaft 52, so that the soldered tops of the respective cans are in the desired relation for proper packing, after the cans are discharged from the casings. The shaft 52 has a drive sprocket 53. The sprocket chain 55 for driving the sprocket 53 from the sprocket 53a of the shaft of the motor 54, is shown in Figs. 1 and 2. This motor 54 is stopped and started at predetermined intervals by the control unit.

As shown in Figs. 9 and 10, the shaft 52 passes through spaced discs 105, which are keyed to said shaft. Said discs 105 have hubs 109, which provided a bearing for an intermediate disc 106, which can turn freely relative to the discs 105 and the shaft 52. A pin 107 passes through the disc 106, and said pin 107 clears the discs 105. Each of the discs 105 is provided with a laterally projecting pin 108. Tension springs 110 connect the pin 107 to the respective pins 108. Stop members 111 are rigidly connected to each of the discs 105. The tension springs 110 normally maintain the recessed ends of said stop members 111 in contact with the pin 107 of the disc 106, as shown in full lines in Fig. 10. The shaft 52 is turned in the direction of the arrow of Fig. 10, together with the discs 105. A slide rod 112 is mounted in bearings 114. A tension spring 115 is connected to one of the bearings 114 and also to a pin 116 which is connected to the slide rod 112, so that said slide rod 112 normally clears the recess which is provided in the disc 106.

As shown in Fig. 9, a governor which has balls 123, is operated by gear means 124 and 125 from the shaft 52. When the speed of the governor falls below a predetermined speed, and the pivoted arms on which the balls 123 are mounted move towards each other until they make a predetermined angle, said arms actuate a plunger 126, which closes a switch 127. This switch controls the circuit of a solenoid 117a, which is located in casing 117. The control of said solenoid is later described herein. When this solenoid is thus energized, its plunger 118 is moved downwardly thus turning the arm 119 and the shaft 120. An arm 121 of the shaft 120 has a forked end which embraces the pin 122 of the rod 112. Therefore, when the solenoid in casing 117 is energized, the rod 112 is moved into the recess of the disc 106, thus stopping the turning movement of said disc. When disc 106 is stationary and when its recess is engaged by rod 112, the tracks of each casing are arranged in superposed pairs, as shown in Fig. 5, for example, so that each track then has a leg whose cross-section is in a horizontal plane.

The momentum of the motor 54 and of the associated parts causes the same to turn at diminishing speed, when the circuit of motor 54 is opened, until the governor operates the plunger 126, to close the circuit of the solenoid in casing 117. The rod 112 is then moved to stop the rotation of the disc 106 and the springs 110 permit the further limited turning movement of the shaft 52, without any severe shock upon the mechanism. When the shaft 52 is stationary, the springs 110 move the stops 111 back to the normal full-line position shown in Fig. 10, in which the recessed ends of said stops 111 abut the pin 107. The bearings 114 may have resilient bottom supports.

The cans which are fed out of each casing are delivered by conventional means to a respective turntable 57, having the usual pockets for receiving the cans. Each turntable 57 is actuated by a motor 57a, which drives the pulley 57c of the shaft of bevel gear 57d, by means of belt 57b. The underside of each turntable has a bevel gear which meshes with a bevel gear 57d. Each can is tilted as it is received in a pocket of the respective turntable 57, so that the cans are located on their ends in said pockets. An electric-eye device is associated with each turntable 57. Each said electric-eye device includes a lamp 58 and a photo-electric cell 59. If the top of a can is bulged, so as to intercept the beam of light from the lamp to the photo-electric cell 59, this operates a conventional relay which causes the cans to be delivered to the rejecting can tracks.

The complete circuit of the photo-electric cell and of its relay and of the solenoid 60 is not shown, as this is a conventional commercial unit per se. The plunger 61 of the solenoid 60 is lowered when solenoid 60 is energized, thus actuating the bell-crank support 62, which is pivoted at 63 and which is connected to the rod of the plunger 61 at 64b. The plunger 61 is raised to normal position by spring 64.

Said bell-crank 62 has a can-support 64a. The imperfect cans are therefore not supported by member 64a, when the solenoid 60 is energized, and said imperfect cans drop to the rejecting tracks. The good cans roll into the packing department along other tracks.

Fig. 4 shows the primary shaft 65 of the control unit, which is mounted in the frame F of the machine. Shaft 65 is driven at constant speed by a synchronous motor 65a. The shaft 65 has a worm 66 which drives the worm gear 67. The shaft of the worm gear 67 has a spur gear 68 which meshes with a larger spur gear 69. The worm gear 70 is stationary and it is provided with a bored hub or web which is connected to the frame F by bolts 71a.

Fig. 3 shows the drum 72 having the disc-shaped end-flanges 73. As shown in Fig. 3, the large gear 69 is connected to one of the end-flanges 73 by a screw or screws 74a.

The drum 72 and its flanges 73 turn freely in unison with gear 69 upon and relative to a first or outer sleeve 74, to which the hubs 75 are keyed. The drum 72 therefore turns freely relative to hubs 75. Each hub 75 has an arm 77. The hubs 75 are adjacent hubs 76, which have arms 76a. Said hubs 76 are keyed to an intermediate sleeve 78 which is mounted turnably on an inner sleeve 79. The outer sleeve 74 turns freely on intermediate sleeve 78. Hubs 80, which have arms 81, are keyed to the inner sleeve 79.

The arms 82 have hubs which are keyed to the shaft 84, on which the sleeve 79 is freely turnable.

The axis of shaft 84 coincides with the axis of rotation of the gear 69.

As shown in Figs. 3 and 4, one of the arms 82 has a bearing in which a worm 82a is mounted. This worm 82a meshes with the stationary worm gear 70. By manually turning the worm 82a, the inclination of the arms 82 in the vertical plane of Fig. 4 can be adjusted. This simultaneously turns the bar A, which is connected to arms 82, about the axis of shaft 84. The face of the stationary worm gear 70 may be provided with a scale of angles in order to indicate this adjustment.

One of the arms 81 has a worm 81a which is turnably mounted in a suitable bearing of said arm. Said worm 81a also meshes with the stationary worm-gear 70. Said worm 81a is turned by means of a member 81b which is turnably mounted in a bearing which is also suitably connected to said arm 81. Said member 81b has a bevel gear 90 which meshes with a bevel gear of the worm 81a. When the worm 81a is turned, the arms 81 are also angularly adjusted. Said arms 81 support a bar C which is identical with the bar A.

The arm 81 which has the bearing for the worm 81a, also has another bearing for a second worm 77c. The worms 81a and 77c are identical. The worm 77c can be turned by means of a member 77b, which is turnably mounted in a bearing which is supported by said arm 81. The member 77b has a bevel gear 91 which meshes with a corresponding bevel gear which is provided on the shaft of the worm 77c.

Figs. 3 and 4 show a worm gear 92 which is rigidly connected to one of the hubs 76. Therefore, when the arms 81 are angularly adjusted by turning the worm 81a, the worm gear 92 is simultaneously turned through the same angle as the arms 81, thus turning the hubs 76 and the intermediate sleeve 78 in unison with the arms 81. The arms 76a of the hubs 76 carry a control bar D which is identical with the bars A and C. Therefore, when the worm 81a is turned by turning the member 81b, and the member 77b and the worm 77c are not turned, the control bars C and D are adjusted in unison through the same arc or angle.

One of the arms 77 has a worm 77a, which can be turned manually. Said worm 77a meshes with the worm gear 92. Therefore, when the member 81b is turned, and the member 77b is not turned, the rotation of the worm gear 92 turns the arms 77 by means of worm 77a, together with the control bar E which is connected to said arms 77. The control bar E is identical with the control bars A, C and D. Therefore, when member 81b is turned alone, the arms C, D and E are adjusted simultaneously through the same arc or angle.

The bar B is identical with the bars A, C, D and E. Said bar B is fixed to the frame F, so that said bar B remains stationary at all times.

If the member 77b is turned and the member 81b is not turned, the gear 92 is turned and the arms 82 remain stationary. The bars A and C will then remain stationary, but the bars D and E will be turned simultaneously through the same arc or angle.

By turning the worm 77a while gear 92 is stationary, the arc or angle between the arms 77 and 76a is adjusted.

Each of these five bars A, B, C, D and E has a series of dovetail slots 94. Heads 95 can be adjustably located in selected slots 94. After a head 95 has been inserted in proper position in its slot 94, the head is fixed relative to its bar by screws 95k.

The heads 95 have respective switches which are biased either to normal open position or to normal closed position, as will be later more fully described.

Fig. 12 shows the construction of said heads and of said switches and it illustrates one of the electrical relays which is used throughout the apparatus.

In Fig. 12 the switch X has blades 96 and 97 which are insulated from each other and from the head 95. These blades are biased to a normal open position. The blade 97 has a cam projection 97b. When the head 98 of the drum 72 is moved in the direction of the arrow shown in Fig. 12, said head 98 will actuate the switch blade 97, so as to close the circuit between the blades 96 and 97. The switch Y has blades 96d and 97d which are biased to normal circuit closing position. The blade 96d has a cam projection 96b. Therefore the head 98 will open the circuit between the blades 97d and 96d. These switch blades are made of suitable resilient metal.

Fig. 12 shows the motor 12 which operates one of the sets of stop-arms 6 and 6a, or both of said sets. If a single motor 12 operates both sets of stop-arms 6 and 6a, said motor is connected to said respective sets by suitable conventional links, so that the stop-arms are actuated in opposite directions. In this embodiment there is a single head 98 whose length is equal to the axial length of the drum 72. However the drum 72 may have a plurality of heads, each head controlling the switches of one of the sets of casings. These heads could be spaced longitudinally from each other on the drum 72, and they would be circumferentially offset relative to each other, and all the control switches for the respective sets of casings can be mounted on one set of bars. In this embodiment we have shown only one set of casings 2a, 3a, 4a and 5a, but there may be any desired number of such sets or series of casings. The sets of casings and their appurtenant parts can thus be operated in succession. The motor 12 is supplied with current through the line 218. This current may be 110 volts, 60 cycles.

Fig. 12 also shows the six-volt line, having the wires W and Wa, whereby current is supplied to the coil or solenoid 100. This six-volt current may be an alternating current and the relay 100 is of the type which produces a magnetic force of fixed direction, although it is energized by alternating current.

This motor 12 has two circuits, so that said motor is turned in one direction or in the opposite direction, depending on which of said circuits is closed. One of said circuits is open when the other circuit is closed. One of these circuits has the contact terminal 104b and the other circuit has the contact terminal 104a. In Fig. 12 the switch-arm 104 is shown in contact with the terminal 104b, and spaced from the terminal 104a. The motor 12 has a conventional control (not shown) whereby its circuit is opened when the shaft-arm 10 is in either of the positions indicated in Fig. 12 and Fig. 25. When the circuit of the solenoid 100 is closed at switch X by the head 98 of the drum 72, through wires 96a and 97a, the energized solenoid 100 downwardly moves its plunger, which has a rod 103 made of insulating material. Said rod 103 moves the switch blade 104 so as to separate it from the contact 104b and also to contact said switch arm 104 with the terminal 104a. The switch blade 105, which is biased to the open position, is simultaneously moved so as to contact with the terminal 105a. This opens one of the circuits of the motor 12 and closes the other circuit of the motor 12, so as to reverse the position of the corresponding stop arm or other part which may be actuated by the respective motor. When the circuit-locking switch blade 105 touches the contact 105a, the circuit of the solenoid 100 is closed through the normally contacting switch blades 96d and 97d of switch Y. Blade 96d is connected to switch arm 105 by wire 100a, and blade 97d is connected to wire W by wire 101. Therefore, the circuit of the solenoid 100 remains closed, even after its circuit has been opened at switch X, and said circuit will remain closed until its circuit has been opened at the switch Y by head 98. When the circuit is thus opened at Y, the rod 103 is moved upwardly by the conventional biasing spring (not shown), so as to open the circuit at the members 105 and 105a, and to move the switch blade 104 back into contact with the terminal 104b. The motor 12 is therefore now operated in a direction reverse to the preceding direction of operation, until its shaft has been moved through a predetermined angle.

Fig. 15 shows an air-inlet pipe 150, a water-inlet pipe 151 and a steam-inlet pipe 152. The air-inlet pipe 150 is controlled by the hand valve 153 and it has the pressure gauge 154. Behind the pressure gauge 154, said air-inlet pipe 150 is connected to branch pipes 155 and 156. In this embodiment, which has only four casings, said four casings are operated simultaneously. That is, their inlet valves are opened simultaneously, said four casings are simultaneously filled with cans, the processing in each casing is simultaneous, and the valves at the outlet ends of said four casings are opened simultaneously. The inlet valves of said four casings are operated simultaneously by a first piston-type motor 157 which is shown in Fig. 24, and the outlet valves of said four casings are controlled simultaneously by a second and identical piston-type motor 157a.

As shown in Fig. 15, the air-inlet pipe 150 is connected through a hand-operated valve 191 to the branch pipes 155 and 156. The compressed air which is admitted through pipe 155 operates motor 157, and the compressed air which is admitted through pipe 156 operates motor 157a. Said motors and their control mechanisms are identical. These motors are of a conventional type and they are not illustrated in detail.

As shown in Fig. 24A, pipe 155 is connected to a duct 236 having spaced outlet ends which are controlled by slide-valve 241. This duct is provided in a valve-casing in which valve 241 is slidable. Said slide-valve 241 has ports 237 and 238. One of said ports registers with one end of duct 236 when the other port is out of registration with the other end of said duct. The valve-casing in which duct 236 is located also has an exhaust duct 239. When the slide-valve is in the position shown in Fig. 24A, the air passes out of duct 236, through the port 238 and pipe 235, into the right-hand end of the cylinder of motor 157, so as to actuate piston 240 to the left. While piston 240 is thus actuated, the air at its left-hand end exhausts through pipe 234, port 237 and exhaust duct 239. When the slide-valve 241 is shifted so that its port 237 registers with the left-hand end of duct 236, the direction of movement of the piston 240 is reversed. The slide-valve 241 of motor 157 is operated by a pair of solenoids 242 and 243, which are shown in Fig. 28, and which are later described. The slide-valve 241 of motor 157a is operated by solenoids 242a and 243a.

Referring to Figs. 21 and 24, the piston of the motor 157 has a piston-rod 158, which is connected pivotally to the link 159. Said link 159 is pivotally connected to the arm 160 of a bell-crank, which is keyed to the shaft 161. Said bell-crank has a second arm 160a. As shown in Fig. 21, said bell-crank arm 160a is forked. The two branches of the arm 160a are pivotally connected to the forked ends of links 162 and 163. As shown in Fig. 22, the link 162 is adjustably connected by means of cooperating threads to an extension 164, which is slidable in a collar 165 which is rigidly connected to a sleeve 166. The member 164 has an extension 164a, which is of reduced thickness so as to provide a shoulder. The collar 167 is slidable within the sleeve 166. A spring 168 has one end abutting the slidable collar 167, and the other end of said spring 168 abuts the shoulder of an inner sleeve 169, in which the extension 164a is slidably located. The sleeve 169 is held from downward movement relative to the sleeve 166 by means of an insert 170 which is rigidly connected to the sleeve 166. The lower end of the extension 164a is externally threaded, and a tapped ring 171 is held upon said externally threaded end. Fig. 22 shows the extension 164a in its normal position and Fig. 23 shows the same in its upper position. The member 164a can also be moved below the position shown in Fig. 22 and for this purpose the insert 170 is provided with a clearance 172. The bottom of the sleeve 166 is provided with lateral bores 166a through which the pivot-pin 173 (see Fig. 17) is passed. This pivot-pin also passes through the external arm 23a of shaft 23. The forked link 163 is connected by the same type of connecting-means to the inlet valve of casing 5a. The branches of the arm 160a thus operate the inlet valves of the casings 5a and 3a. The member 174, which is similar to the forked arm 160a, is keyed to the shaft 161 and it operates the inlet valves of the casings 4a and 2a, by connecting-means of the type above described.

The piston-type motor 157a similarly operates all the outlet valves of the four casings, by means of connecting-means of the said type.

Pipes 150, 151 and 152 are connected to a common distribution pipe 175. As shown in Figs. 1 and 2, this distribution pipe 175 is connected to a pipe 175a. Each of the respective ends of pipe 175a is connected to two pipes 175b which are connected to the respective distributing headers 178 of the casings 2a, 3a, 4a, 5a. Each distributing header 178 has a liquid-tight and air-tight packing 179 as shown in Figs. 5, 6 and 8, and said packing is perforated between the edge flanges of the header 178 so as to admit nozzles 179a through which the air or water or steam are admitted into the respective casing. Each distributing header 178 extends over substantially the entire length of the respective casing and the nozzles 179a are located over substantially the entire length of the respective casing.

The air-inlet and water-inlet pipes 150 and 151 are provided with motor-operated valves 180 and 181.

When the hand-valve 153 is opened, air under pressure is continuously supplied to the pipes 155 and 156. The pressure of the air which is thus supplied to the pipes 155 and 156 is controlled by the regulating valve 191. Likewise, the pressure of the air which is supplied to the pipe 175 is controlled by the regulating valve 190. The pipe 150 is also provided with a check-valve 193 which prevents any reverse flow of fluid from the pipe 175.

The water-supply pipe 151 has the usual hand-valve 192. Said pipe 151 also has a check valve 194 which prevents any reverse flow of fluid from the pipe 175. The steam inlet pipe 152 also has a hand-operated valve 195 and a check-valve 196. The steam-inlet pipe 152 is also provided with a pressure gauge 197 and a separator 198 for separating oil or the like from the steam.

The steam-inlet pipe 152 is connected between its ends to a valve casing 199, as shown in Fig. 15A. Said valve-casing 199 has a valve 200 which is normally kept closed by the steam pressure in the left-hand branch of the pipe 152. This type of valve is of conventional type and it is known commercially as the "Spence" dead-end valve. The valve 200 is connected to a spindle 201 which is connected to a flexible diaphragm 202, which is clamped between the casing 199 and a cap 203 so as to provide a steam-tight closure. The area of the diaphragm 202 is greater than the maximum area of the valve 200. Therefore, if the underside of the diaphragm 202 is subjected to a pressure which is equal to the pressure of the steam in the left-hand branch of pipe 152, said diaphragm 202 is flexed upwardly, thus raising the valve 200 from its seat and establishing communication between the two branches of the pipe 152. Spring 212 biases the valve 200 to its closed position, so that said valve 200 is normally closed. The pipe 204 has its lower end in communication with the left-hand branch of the pipe 152. The upper end of said pipe 204 is connected to an annular pipe 207, which is connected by means of a branch pipe 206 to the space below the diaphragm 202. At the left-hand side of pipe 204, said pipe 207 has a solenoid-operated valve 208 and it also has a pressure-regulating valve in a casing 209. At the right-hand side of said pipe 204, said pipe 207 has a pressure-regulating valve in a casing 209a and a solenoid-controlled valve 210. There are thus two lines which are arranged in parallel between the pipe 204 and the space below the diaphragm 202. The valve in casing 209 is regulated so as to provide low-pressure steam and the valve in casing 209a is regulated so as to provide high-pressure steam. The high pressure may be about 28 lbs. per square inch above atmospheric pressure, and the low pressure may be about 4 lbs. per square inch above atmospheric pressure. The lower end of the pipe 205 is in communication with the right-hand branch of the pipe 152 and the upper end of said pipe 205 is connected to a U-shaped pipe 211. The ends of the pipe 211 are connected to the annular pipe 207. The valves 208, 210 and the valve-casings 209 and 209a are located intermediate the ends of the pipe 211. The pipes 205 and 211 provide a bleeder for the relief of pressure under the diaphragm 202. When the valve 208 is opened, steam flows from the left-hand branch of the pipe 152 into the space below the diaphragm 202, thus raising the valve 200. When the valve 210 is opened and the valve 208 is closed, the valve 200 is also raised and the regulating valve in casing 209a causes steam to be supplied to the right-hand branch of the pipe 152 at the above mentioned relatively high pressure.

One end of pipe 211a is connected to valve-casings 209 and 209a. The other end of said pipe 211a is connected to casings 2a, 3a, 4a, 5a. The pressure-regulating valves in casings 209 and 209a are not shown, as this type of valve is conventional. It is sufficient to state that each casing 209 and 209a has a diaphragm-operated valve of the type shown in Fig. 15A, and a spring which biases the valve to open position. The pressure in the casings 2a, 3a, 4a, 5a, is transmitted through pipe 211a to the diaphragms in casings 209 and 209a. When the pressure in casing 209 reaches the desired low limit, the diaphragm in casing 209 closes the low-pressure valve. The steam which is then trapped under diaphragm 202 can then pass through pipes 207 and 211 and 205, to the right-hand branch of pipe 152. The pipes 207 and 211 and 205 also operate as a bleeder for said trapped steam, when the high-pressure valve in casing 209a is closed.

As shown in Fig. 2, the casings 4a and 5a are connected to a common drain pipe 220 by couplings 221. Casings 2a and 3a are connected to a common drain pipe 220a by couplings 222. These drain pipes have drain valves 226a, which are operated by the arms 228 of motors 227a. Each casing has a low-pressure control 331, a pressure gauge 223, a thermometer 224, and a safety high-pressure control 225.

For convenience, it is assumed that the cycle of operation of the machine begins when the respective casings 2a, 3a, 4a, 5a have been loaded with cans. At the beginning of the cycle, the rear outlet valves of said casings are closed and their front inlet valves are open. The motor 54 is stationary, and the stop rod 112 is in locking position. The tracks T are then arranged as shown in Figs. 5 and 9, the tracks of each casing being arranged in superposed pairs, each said track having a leg thereof located so that its cross-section is in a horizontal plane.

As shown in Fig. 27, the solenoid 117a is supplied with current from the line 218. This line has a switch in the box 219. This line delivers ordinary commercial alternating current, having a voltage of 110 volts and 60 cycles per second. The solenoid or coil 117a is of the type which produces a magnetic force of fixed direction, although it is energized by alternating current. A rectifier could be included in the circuit of the solenoid or coil 117a, so as to supply direct current. Whenever we refer to a solenoid or coil or motor or relay, we include all types of electrically operated devices. Likewise the invention is not limited to an electrical control system.

The line 218 is coupled by a step-down transformer 220 to the line 247, to which a six-volt current is supplied. The line 247 supplies current to the coils or solenoids of various relays. Said six-volt line has the switches 259 and 260. The switch 259 is biased to normal closed position. The switch 260 is biased to normal open position.

At the beginning of the cycle the locking bar 112 is in the locking recess of the disc 116. Fig. 27 shows the projection 112a of the locking bar 112, and it shows how this projection 112a maintains the switch 260 in closed position, when the spring 115 maintains the bar 112 out of the recess in the disc 106. At the beginning of the cycle, since the bar 112 is in the locking position, its projection 112a releases the switch 260, which is then open. Fig. 27 also shows the notched cam-sleeve 52d of the shaft 52. At the beginning of the cycle, the parts of the switch 259 are in the full-line position which is illustrated in Fig. 27, and said switch is closed. The plunger 126 of the governor has a hook which engages both arms of the switch 259. When the motor and its governor are stationary, the plunger 126 is lowered so that the two arms of the switch 259 are then in the full-line position shown in Fig. 27. During the operation of the motor, the plunger 126 is raised so as to move the arms of the switch 259 to the broken line position illustrated in Fig. 27. The switch 259 therefore remains closed during the cycle, while the motor 54 is running.

Fig. 27 also shows the synchronous motor 65a, which can be connected to the line 215 by means of the manually operated switch 214. This line delivers single-phase current of 220 volts. The motor 54 is started by means of the conventional "line starter" relay 221, which is energized when the movable switch arm 261a touches the terminal 226. At the beginning of the cycle, and as shown in Fig. 27, the switch arm 261a is spaced from the terminal 226.

The circuit of the solenoid 117a has the normally closed switches 227 and 257 and the normally open switch 127. Since the motor is now stationary, the plunger 126 now maintains the switch 127 in closed position.

*Closing the inlet valves*

The first operation in the cycle is to close the inlet valves. A safety control, which will be later described, is provided so that the machine will not operate unless all the inlet valves are closed. This is to prevent steam and water and air from shooting out of the casings. Referring to Fig. 28, the slide valve 241 of the motor 157 is connected by suitable means (not shown) to the cores of the solenoids 242 and 243. These solenoids can be energized by the current which is supplied through the 110-volt line 218.

Each of the solenoids 242 and 243 has one end thereof connected directly to one side of the line 218. The other end of the solenoid 242 is connected to the terminal 245, and the other end of the solenoid 243 is connected to the terminal 244. The other side of the line 218 is connected to a movable switch arm 246.

In the position of the switch arm 246 which is shown in Fig. 28, the solenoid 242 has just been de-energized, and the solenoid 243 has just been energized by moving member 246 into contact with member 244. The core of the solenoid 243 will be moved from left to right, thus actuating the slide-valve 241 of the motor 157, to a position in which said motor will close the inlet valves and hold them closed. The core of the de-energized solenoid 242 will also be moved from left to right, since both cores are connected to slide-valve 241. The switch arm 246 is actuated by a relay which is of the type previously shown in Fig. 12. The solenoid 340 corresponds to the solenoid 100. The solenoid 340 has a circuit-locking switch 341 which corresponds to the circuit-locking members 105 and 105a of Fig. 12. The switch arm 246 corresponds to the switch arm 104, and the contacts 244 and 245 correspond respectively to the contacts 104b and 104a.

In Fig. 12 it will be noted that the wire 96a of the switch X and the wire 101 of the switch Y have a common connection to the line wire W of the six-volt circuit.

One end of the solenoid 340 is directly connected to the line wire Wb of the six-volt circuit.

The other end of the solenoid 340 is connected to the wire 338.

Referring to Fig. 30, the wire 338 is connected to one side of the normally open switch 337, which is located on the bar E. This normally open switch, like the other normally open switches which are located on the respective bars, is of the type of the switch X. The other side of the switch 337 is connected to the wire 339, which corresponds to the wire 96a of Fig. 12. As soon as the solenoid 340 is energized, it closes the locking switch 341. Therefore, after the head 98 has released the switch 337, the current passes from the line wire Wb through the solenoid 340, through the closed locking switch 341, and to the wire 342.

Referring to Fig. 30, the wire 342 is connected to one side of the normally closed switch 343, which is mounted upon the bar A. The other side of the switch 343 is connected by means of the wire 338c to the line wire W. The connection of the wire 338c to the line wire W is not shown in Fig. 28, because the wires 339 and 338c have a common connection to said line wire W, just as the wires 96a and 101 of Fig. 12 have a common connection to the line wire W.

The inlet valves will remain open until the head 98 has been moved away from the bar E and until said head 98 opens the switch 343 on the bar A. This normally closed switch 343 and the other normally closed switches on the bars, are of the type of switch Y.

As soon as the solenoid 340 has been de-energized, a biasing spring (not shown) moves the switch arm 246 to contact with the terminal 244, and the locking switch 341 is opened, since it is biased to opening position.

The inlet valves are therefore closed by opening normally closed switch 343. The inlet valves are opened by closing the normally open switch 337.

*Releasing the stop bar and starting the motor*

After the inlet valves have been closed, the next operations are to release the locking bar 112, and to start the motor 54. The locking bar 112 should be released before the motor is started, in order to prevent jamming. The solenoid 117a must therefore be de-energized in order to enable the spring 115 to move the locking bar 112 out of locking position, before the motor 54 is started. As previously stated, the circuit of solenoid 117a has the normally closed switches 227 and 257 and the normally open switch 127. Switch 127 is shown closed in Fig. 27, as previously stated, because plunger 126 of the governor now holds switch 127 closed. The solenoid 117a is now de-energized by energizing the control solenoid 261 of Fig. 27. This opens the switch 257 and closes the locking switch 270 of solenoid 261. One end of the control solenoid 261 is directly connected to the line wire Wa, which is connected to one side of the six-volt line 247 through the safety switch 253, whose function will be later described. The other end of the control solenoid 261 is connected to wire 262, which is connected to one side of the normally open switch 263 on the bar A. The other side of said switch 263 is connected by the wire 264 to the line wire W. One side of the locking switch 270 is connected to the wire 271 which is connected to one side of the normally closed switch 273, which is located on the bar D. The other side of the switch 273 is connected to the wire 271a, which has a common connection with the wire 264 to the line wire W.

The solenoid 261 therefore operates to de-energize the solenoid 117a as soon as the switch 263 is closed, and to maintain the switch 257 in the open position until the locking switch 270 is opened, by opening switch 273.

The next operation is to energize the solenoid 229. One end of the solenoid 229 is connected to the line wire Wa. The other end of the solenoid 229 is connected to the wire 230, which is connected to one side of the normally open switch 233 on the bar A. The other side of said switch 233 is connected by the wire 231 to the line wire W. One side of the locking switch 228 of the solenoid 229 is connected to the wire 232, which is connected to one side of the normally closed switch 336 of the bar D. The other side of the switch 336 is connected to one side of the normally closed switch 298a, which is located on the bar B. The other side of said switch 298a is connected to the wire 231, which is connected to the line wire W. Therefore, the solenoid 229 will be de-energized if either of the switches 336 and 298a are opened. When the solenoid 229 is energized, it opens the switch 227, as it closes the switch of the line starter 221, thus providing an additional safety factor in preventing the motor 54 from starting until the locking bar 112 has been moved out of locking position. If for any reason, the switch 257 is not opened by the solenoid 261, the switch 227 will be opened when the switch arm 261a is moved against the terminal 226 in order to energize the line starter 221.

*Admitting low-pressure steam for pre-heating the canned milk or other food product*

The drain valves 226a are kept open for a short time after the low-pressure steam is admitted, in order to remove air from the casings 2a, 3a, 4a, 5a. The automatic controls for regulating the pressure within said casings, when water or steam or air is supplied thereto, will be later described. Fig. 2 shows one of the motors 227a, of the type previously mentioned, for operating a drain valve 226a. This motor has two circuits of the type previously described. These circuits have stationary terminals 281 and 282 which are shown in Fig. 28, between which a switch blade 283 can be moved, so as to contact with either of said terminals 281 and 282. Fig. 28 shows the normal or biased position of the switch blade 283, in which the drain valve is open. The terminal 281 is directly connected to one side of one of the circuits of the motor 227. The terminal 282 is connected to the circuit of the motor through the members 334, 333, 328 and 326. Since these members 334, 333, 328 and 326 relate to the pressure controls which will be later more fully described, it will be assumed that the member 34 remains in contact with the member 333, and that the member 328 remains in contact with the member 326.

When the control solenoid 284 is energized, it will move the switch blade 283 from the terminal 281 to the terminal 282, thus supplying power to the valve-closing circuit of the motor 227a to close the drain valve 226a. At the same time, the locking switch 285 of the solenoid 284 will be closed. One end of the solenoid 284 is connected to the line wire Wb. The other end of the solenoid 284 is connected by wire 286 to the normally open switch 288 of the bar A. The other side of the switch 288 is connected by wire 289 to the line wire W. The locking switch 285 has one side thereof connected to the wire 287, which is connected to one side of the normally closed switch 290 of bar D. The other side of said normally closed switch is connected through the wire 289 to the line wire W. The solenoid 208a of the low-pressure control valve 208, as shown in Fig. 29, has its circuit controlled by a switch 274. When the solenoid 275 is energized, it closes the switch 274, and it also closes the locking switch 276 for the circuit of said solenoid 275. One end of the solenoid 275 is connected to the line wire Wa. The other end is connected by the wire 277 to one side of the normally open switch 278 of the bar A. The other side of said switch 278 is connected by the wire 286, to the line wire W. One side of the locking switch 276 is connected to the wire 279. As shown in Fig. 29, this is connected to the wire 280a. As will be later explained, this wire 280a is connected to the locking switch 293 of the solenoid 291, which controls the supply of high-pressure steam. As shown in Fig. 30, the wire 280a is connected to one side of the normally closed switch 280 of the bar C. The other side of this switch 280 is connected to the wire 296, which is connected to the line wire W.

The head 98 will therefore first close the switch 278 to turn on the low-pressure steam, and after a few seconds said head will close the switch 288, thus energizing the solenoid 284, thus moving the switch blade 283 to the terminal 282, and thus energizing the motor 227 to close the drain valve.

Prior to turning on the low-pressure steam, the motor 54 is energized in order to rotate the tracks, so that the cans will be turned end-over-end during the heating with the low-pressure steam. The low-pressure steam is utilized to pre-heat the cans of milk or other food products until their temperature is about 200° F.–210° F. This pre-heating period may be about one and one-half minutes. It is desirable to produce a relative movement between the milk and the cans, as by turning the cans end-over-end, during this pre-heating period. This relative movement facilitates the rapid heating of the milk or the like, and it also prevents the milk from baking on the interior walls of the cans.

Therefore, the solenoids 261, 229, 275 and 284 are consecutively energized, in the order named.

*High-pressure steam*

As previously mentioned, the pressure of the high-pressure steam is about 28 lbs. above normal atmospheric pressure. Fig. 29 shows the solenoid 210a for controlling the valve 210, which controls the admission of steam under high-pressure. The solenoid 210a, like the solenoid 208a, is connected to the line 215. The circuit of the solenoid 210a has a normally open switch 292, which corresponds to the normally open switch 274. When the solenoid 291 is energized, it closes the switch 292, and it also closes the locking switch 293 of said solenoid 291. One end of the solenoid 291 is connected to the line wire Wa. The other end of the solenoid 291 is connected to the wire 297, which is connected to one side of the normally open switch 298 of the bar B. The other side of said switch 298 is connected by the wire 299 to the line wire W. One side of the locking switch 293 is connected to the wire 280a, and this is connected to one side of the normally closed switch 280 of the bar C. The other side of the switch 280 is connected by the wire 296 to the line wire W.

High-pressure steam is therefore admitted after the switch 298 has been closed, until the head 98 opens the switch 289. When the switch 289 is opened, the entire steam supply is shut off due to the connection of the wire 279 to the wire 280a, which has previously been described. If milk is being processed, the high-pressure steam is utilized for a total period which may vary from about ninety seconds to three and one-half minutes. The motor 54 is maintained in operation to turn the rails and to turn the cans end-over-end, only during a preliminary sub-period of the entire period in which the high-pressure steam is utilized. This sub-period may be about forty-five seconds. Thereafter, the rails and cans are maintained stationary during the remainder of the treatment with the high-pressure steam. Automatic means are therefore provided for shutting off the power supply to the motor 54, before the completion of the entire treatment with the high-pressure steam. The high-pressure steam raises the temperature of the canned milk to about 260° F., during said preliminary period of about forty-five seconds, and before the power supply to the motor 54 is shut off. Since the milk is maintained stationary during the remainder of the treatment with the high-pressure steam, its temperature will rise slowly to about 265° F., during the entire treatment with the high-pressure steam. The head 98 opens the normally closed switch 298a of the stationary bar B, at the end of said period of forty-five seconds. This has the same effect as opening the switch 336 of bar D, so that the solenoid 229 is de-energized, thus opening the line starter 221.

*Admission of compressed air into the casings*

Just before the supply of high-pressure steam is turned off, or substantially simultaneously with stopping the supply of high-pressure steam, compressed air is admitted into the casings from the pipe 150. This compressed air is preferably at normal room temperature of about 70° F. This air supplies enough pressure in the casings external to the cans, so as to prevent the internal pressure of the heated milk and of its vapor from warping the cans, until the cans have been cooled sufficiently to lower said internal pressure so as to eliminate excessive internal pressure. The air builds up an air pressure within the casings of a little more than 28 lbs. per square inch above the normal atmospheric pressure. As shown in Fig. 29, the motor 180a which operates the air valve 180 is of the type previously described. The two circuits of the motor 180a are connected to a stationary terminal 304, and also to movable switch arms 302 and 303. In the positions of the switch arms 302 and 303 which are shown in Fig. 29, the air valve 180 is closed. When the solenoid 301 is energized, it moves switch arm 302 against the terminal 304, switch 303 away from the terminal 304, and the locking switch 305 of solenoid 301 is also closed. This energizes the motor 180a to open the air valve. One end of the solenoid 301 is connected to the line wire Wa. The other end of the solenoid 301 is connected to the wire 306, which is connected to one side of the normally open switch 307 of the bar C. The other side of the switch 307 is connected to the wire 308, which is also connected to one side of the normally closed switch 311. The wire 308 is connected to the line wire W. One side of the locking switch 305 is connected to the wire 309 which is connected to one side of the normally closed switch 310 of the bar D. The other side of said switch 310 is connected to one side of the switch 311. Therefore, the air supply is shut off, when the normally closed switch 310 is opened, or when the normally closed switch 311 is opened.

*Cold water supply*

After sufficient air pressure has been built up in the casings so as to prevent the cans from being distorted during the cooling operation, cold water is supplied through the pipe 151. Fig. 29 shows the motor 181a for operating the cold-water valve 181. The two circuits of this motor are connected to the stationary terminal 313 and to the movable switch arms 311 and 312. In the positions of said parts which are shown in Fig. 29, the cold-water valve is closed. When the solenoid 314 is energized, it moves the switch arm 311 against the terminal 313, the switch arm 312 away from the terminal 313, and the locking switch 315 of solenoid 314 is simultaneously locked. The motor 181a is therefore operated to open the valve 181. One end of the solenoid 314 is connected to the line wire Wa, and the other end is connected by the wire 316 to one side of the normally opened switch 317 of the bar C. The other side of the switch 317 is connected by the wire 271a to the wire 264, and to the line wire W. One side of the locking switch 315 is connected to the wire 318, which, as shown in Fig. 30, is connected to the wire 271 and to one side of the normally closed switch 273 of the bar D. The other side of the switch 273 is connected by the wires 271a and 264 to the line wire W.

The motor 54 is actuated either simultaneously with the admission of cold water, or shortly after the admission of the cold water, in order to hasten the cooling effect. When the cold water valve is opened, the locking bar 112 is out of locking position, but the supply of current to the motor 54 has been shut off by de-energizing the relay 229. This was done prior to the completion of the treatment with the high-pressure steam, as previously stated. During the cooling of the cans, the relay 229 is energized by closing the normally opened switch 344 of the bar C. As shown in Fig. 30, the wires 231 and 230 are connected to the respective sides of the switch 344. Just prior to closing switch 344, the normally open switch 345 of bar C is closed. This switch is connected to wires 262 and 231, so that solenoid 261 is energized.

As soon as there is enough water and air in the casings to maintain the necessary external pressure upon the cans, the supply of air is shut off by opening the normally closed switch 311 of the bar C. At the end of the cooling period, the supply of current to the motor is discontinued by opening switch 336 of bar D.

*Low-pressure control*

As soon as or before the water and air in the casings produce the desired external pressure upon the cans, in order to prevent them from being distorted by excessive internal pressure, the low-pressure safety control is energized, in order to open and close the drain valves 226a. These drain valves are opened during the cooling period if the pressure exceeds about 20 lbs. per square inch above normal atmospheric pressure, and these drain valves are closed during the cooling period, if the pressure falls below 14 lbs. per square inch above normal atmospheric pressure. The low-pressure safety control is adjusted so as to make proper allowance for the slow opening and closing of the drain valves.

The low-pressure safety control is a mercury switch which is operated by means of a suitable diaphragm or the like, by the pressure within the casings. This mercury switch is diagrammatically represented in Fig. 28 by the member 225. Fig. 28 diagrammatically shows the contacts 325, 323 and 324 of this mercury switch. For convenience it may be assumed that the pressure of the diaphragm which actuates the mercury switch, moves the arm 323 away from the terminal 324, to contact with the terminal 325, when the pressure within the casing is above the predetermined limit. If the pressure within the casing is at or below said predetermined limit, the arm 323 touches the contact 324. The low-pressure control 225 functions only when the relay 284 is energized, so as to urge the blade 283 into contact with the terminal 282.

In order to utilize the low-pressure control, it is necessary to energize the solenoid 321. One side of the solenoid 321 is connected to the line wire Wa. The other side of the solenoid 321 is connected by the wire 329 to one side of the normally open switch 330 of the bar C. The other side of said switch 330 is connected through the wire 296 to the line wire W. As shown in Figs. 28 and 29, one side of the locking switch 320 of the solenoid 321 is connected to one side of the locking switch 315 of the solenoid 314 which controls the cold-water supply. Therefore the relay 321 remains energized and the low-pressure control is effective until the cold-water supply has been shut off.

When the relay 321 is energized, it moves the switch arm 326 away from the stationary terminal 328, and it moves the switch arm 327 into contact with the stationary terminal 328.

As long as the arm 323 contacts the terminal 324, the valve-closing circuit of the motor 227a is closed through the terminal 283, the switch arm 282, the members 334 and 333, the stationary terminal 328, the arm 327, and the members 323 and 324. The drain valve will therefore remain closed until the pressure has exceeded the predetermined upper limit. When the pressure has exceeded this predetermined upper limit, the arm 323 contacts with the terminal 325 instead of contacting with the terminal 324. This opens the valve-closing circuit of the motor 227a, and closes the valve-opening circuit of the motor 227a. The motor 227a will therefore operate to open the drain valve and to relieve the pressure. The drain valve 226a will therefore be opened and closed during the cooling operation to build up pressure if it falls below the lower limit or to prevent the pressure from exceeding the upper limit, until the cans have been cooled below the temperature at which excessive internal pressure may exist.

*Readmission of cold air into the casings before the supply of cold water is discontinued*

It is desirable to re-admit the compressed air into the casing just prior to the shutting off of the cold-water supply or simultaneously with the shutting off of the cold-water supply. During the cooling operation the casings are partially filled with compressed air. This compressed air enters "leakers" in order to provide means for detecting imperfect or leaking cans. The compressed air is re-admitted into the casings just prior to the shutting off of the cold-water supply, in order to drive the water out of the casings rapidly and to maintain the air pressure within the casings until substantially all the water has been driven out. This re-admission of the compressed air facilitates the detection of "leakers," by insuring proper air pressure as long as possible. The cans are cooled during a relatively short period of about two minutes so that it is desirable to maintain sufficient external air pressure as long as possible. The head 98 therefore closes the normally open switch 335 of the bar D, so as to energize the motor 180a just before opening the switch 273. The motors 227a are operated so as to positively open the drain valves 226a just before the supply of cold water is shut off, and just before the compressed air is re-admitted. The compressed air is admitted with sufficient rapidity in order to prevent the pressure within the casings from dropping too low while the water is forced through the open drain-valves.

The motor 54 is de-energized at about the time when the supply of cold water is shut off. This is done by opening the switch 336 of the bar D. The solenoid 111a is ready to move the bar 112 into locking position, as soon as the switch 127 has been closed by the governor-plunger 126. The supply of compressed air is now discontinued by opening the normally closed switch 310 of the bar D.

The outlet valves are now opened by closing the normally opened switch 337a of the bar D. The slide valve for the motor 157a of the outlet valves is controlled by the solenoids 242a and 243a which are identical with the solenoids 242 and 243.

For example, the member 244a corresponds to the member 244, the solenoid 340a corresponds to the solenoid 340, etc.

*Closing the outlet valves after the casings have been unloaded*

After the casings have been unloaded, the head 98 opens the normally closed switch 343a of the bar E, thus de-energizing the solenoid 340a and thereby setting the motor 157a to close the outlet valves.

*Opening the inlet valves*

After the casings have been unloaded, the inlet valves are opened, in order to admit a fresh load of cans into the casings. This is done by closing the normally open switch 337 of the bar E.

*Moving the stop arms 6a to the inoperative position and moving the stop arms 6 to the operative position, in order to admit a fresh load of cans into the casings*

This is done by closing the normally open switch X of the bar E.

*Safety control for preventing the admission of fluid into the casings unless all the inlet valves are closed*

If for any reason one or more of the inlet valves remain open during the above mentioned cycle, the fluid, such as water or steam or air, will flow out of the casings at high velocity. As shown in Fig. 27, the line wire Wa is connected to one side of the six-volt line through the normally closed switch 253. Each of the switch arms 247a, 248, 249 and 250 is movable, so that it can contact with its respective terminal, and these four terminals have a common connection to a terminal 252. The switch arms 247a, 248, 249 and 250 are spaced from their respective terminals when their respective valve flaps are closed. The operating arm of each valve flap has a fibre button or the like, which is pressed against the respective switch arm 247a-250, so that when the valve flap is open, the respective switch arm 247a-250 contacts with its terminal. Therefore, the switch arms 247a-250 are spaced from their respective terminals, only when all the inlet valves are closed. The solenoid 251 will be energized, unless all of the switch arms 247a-250 are in their circuit-opening positions. When the solenoid 251 is energized, it moves the switch arm 253 away from its terminal and it also closes the locking switch 252d of said solenoid 251 so that it touches the common terminal 252. The locking switch 252d is connected to the wire 255, which is connected to one side of the normally closed switch 256 of the bar A. The other side of said switch 256 is connected by the wire 254, to one side of the six-volt line 247. If the switch 253 is in the open position, no current is supplied to the line wire Wa, and therefore the relays 229, 261, 100, 321, 314, 301, 275 and 291 cannot be energized.

The control unit will therefore operate through a complete cycle, until the beginning of the next cycle, when the solenoid 251 will be de-energized by opening the normally closed switch 256, save that, if any of the switch arms 247a—250 touch their respective terminals at the beginning of the next cycle, the supply of current to the solenoid 251 will be continued.

It is therefore impossible to operate the machine unless all the inlet valves are closed.

*High-pressure safety control*

An automatic high-pressure safety control is provided, which is operative at all times to open the drain valve if the fluid pressure within the casing exceeds a predetermined limit. This safety control operates under excessive pressure of water, gas or vapor. The high-pressure safety control member 331 may be a mercury switch, like the member 225. When the pressure is below the predetermined upper limit, the members 334 and 333 are in circuit-closing relation. When the pressure is equal to or above the predetermined limit, the members 334 and 332 are in circuit-closing relation and the circuit between members 334 and 333 is opened. When the members 281, 283 and 282 are in the positions shown in Fig. 28, the motor 227a has opened the drain valve. Therefore, the valve-opening circuit of the motor 227a has been completed through the wires 227d and 227e. At the completion of the movement of the motor 227a to open the drain valve 226a, the circuit of the wires 227d and 227e is automatically opened in the motor itself, by conventional and well-known means. When the solenoid 284 is energized, the switch arm 283 is moved away from the terminal 281, and said switch arm 283 is moved to contact with the terminal 282. The valve-closing circuit of the motor 227a is now closed between the wires 227d and 227c, so that said motor 227a now closes the drain valve. After the motor 227a has closed the drain valve, it automatically opens the circuit between the wires 227c and 227d by the conventional means previously stated. If the members 334 and 332 contact with each other, due to excessive pressure, the circuit between the wires 227d and 227e is closed through the members 332 and 334 and through the switch arm 282 and the terminal 283. Therefore, the motor 227 will operate to open the drain valve at any time while the solenoid 284 is energized, as soon as the members 334 and 332 come into contact.

*Sequence of operation of the switches on the Bars A—E*

This sequence is as follows:

Switch 343 of bar A is opened in order to close the inlet valves.

Switch 256 of bar A is now opened so as to de-energize relay 251, if all the switch arms 247a–250 are spaced from their respective terminals.

Switch Y of bar A is then opened so as to actuate the stop-arms, in order to accumulate a fresh load of cans up to the stop-arms 6a, immediately after the inlet valves have been closed.

Switch 263 of bar A is then closed to release the locking bar 112.

Switch 233 of bar A is then closed in order to start the motor 54 and to turn the tracks.

Switch 278 of bar A is then closed in order to admit the low-pressure steam. The drain valves 226a are in the open position.

After a few seconds, switch 288 of bar A is then closed, in order to close the drain valves 226a.

This completes the actuation of the seven switches of bar A.

Switch 298 of bar B is then closed in order to admit high-pressure steam.

Switch 298a of bar B is then opened, in order to shut off the power to the track-motor 54, after the high-pressure steam has been supplied during a predetermined sub-period.

This completes the actuation of the two switches of bar B.

Switch 280 of bar C is then opened to shut off all steam supply.

Switches 307 and 317 of bar C are then closed substantially simultaneously, in order to admit compressed air and cold water substantially simultaneously. The switch 307 may be closed just prior to closing the switch 317 and also prior to opening switch 280, in order to admit compressed air prior to shutting off the steam and before admitting the cold water. It is preferred to admit compressed air before the steam is shut off, then to shut off the steam while continuing to admit compressed air, and then to admit the cold water while the supply of compressed air is continued.

Switch 345 of bar C, which is connected to wires 262 and 231, is then closed, as a safety device, to energize relay 261 in order to open switch 257 and thus de-energize solenoid 117a, so that the stop bar is released.

Switch 344 of bar C, which is connected to wires 230 and 231, is then closed in order to supply power to the track-motor and to turn the tracks during the admission of the cold water. The switch 344 can be closed substantially simultaneously with the closing of the switch 317, so that the cans are turned substantially during the entire cooling period.

Switch 311 of bar C is opened to shut off the supply of compressed air, as soon as enough cold water has been admitted in order to maintain the desired external pressure on the cans during the cooling operation.

The switch 330 of bar C is closed in order to set the low-pressure control into operation. The switch 330 is closed simultaneously, or substantially simultaneously, with the switches 307 and 317, so that the low-pressure control operates at all times during the admission of cold water.

This completes the operation of the seven switches of bar C.

Switch 335 is then opened to admit compressed air, to drive out water and water vapor.

Switch 290 is opened, in order to open the drain valves.

Switch 273 of bar D is then opened to shut off the supply of cold water and also to simultaneously de-energize the low-pressure control, also simultaneously to open the locking circuit of solenoid 261, so that switch 257 is closed, thus energizing solenoid 117a when switch 127 is closed, so that solenoid 117a will move bar 112 to its locking position.

At the completion of the cooling period, switch 336 on bar D is opened in order to discontinue the supply of current to motor 54.

Switch 310 of bar D is then opened in order to discontinue the supply of compressed air.

Switch 337a of bar D is then closed in order to open the outlet valves.

This completes the operation of the six switches of bar D.

The cans are now unloaded from the casings.

Switch 343a of bar E is now opened in order to close the outlet valves.

Switch 337 of bar E is now closed in order to open the inlet valves.

Switch X of bar E is now closed in order to admit a fresh load of cans into the casings.

The switches shown in Figs. 27–30 are biased to the normal positions shown in said figures, with the exception of the switches 260 and 127.

The circuit of the six-volt line 247 is closed through switch 259 when the motor 54 is stationary, and also through switch 260 when the locking bar 112 is in the locking position. When motor 54 is turning, switch 260 is open, but plunger 126 then raises the resilient arms of switch 259 to the broken-line position shown in Fig. 27, so that switch 259 is held closed.

The control bars A—E may be designated as being movable relative to each other, although the bar B is stationary.

Referring to Fig. 17, the valve casing 16 may be designated as a part of or an extension of the respective main casing 2a, 3a, 4a, or 5a. A bridge member 28 is therefore located respectively within each main casing.

While it is preferred to rotate the tracks of the respective casings about respective axes, independently of said casings, the invention is not limited to this. Likewise, whenever an electromagnetic control device, such as a motor or solenoid or the like, is specified in a claim or claims, said claim or claims include within their scope control devices of other types, such as hydraulic, pneumatic, photo-electric and the like.

The supply valves, by means of which steam and water and compressed air or other compressed gas are supplied to the casing, are biased by suitable springs or the like to normally closed position. In the claims which specify the novel sub-combinations of our invention, all the parts which are required for the complete operation of our machine in the preferred embodiment are not specified, since a claim for a subcombination need not specify all the parts of an operative device.

We claim:

1. In a machine for processing a food product, the sub-combination of a casing having an inlet-valve and an outlet-valve, automatic means adapted to open and to close said inlet-valve and said outlet-valve, automatic means adapted to admit steam into said casing only when said valves are closed and to shut off the steam supply at the end of a predetermined period, and automatic means adapted to admit cold water and air under pressure into said casing substantially simultaneously, and after the supply of steam into the casing has been discontinued.

2. A machine for processing a food product which is enclosed in cans, comprising a casing, rotatable track-means located in said casing, said casing having an inlet-valve and an outlet-valve, a motor to rotate said track-means, a movable stop bar to stop the rotation of said track-means when the stop bar is in operative position, means to move said stop bar out of its operative position, a first device to move said stop bar into operative position and to hold the stop bar in said operative position, steam-inlet means connected to said casing, said steam-inlet means comprising respective steam-valves to admit either low-pressure steam or high-pressure steam into said casing, said steam-valves being normally closed, a second device to open the low-pressure steam-valve, a third device to open the high-pressure steam-valve, an air-inlet member connected at one end thereof to said casing and at the other end thereof to a source of compressed air, said air-inlet member having a normally closed air-valve, a fourth device to open said air-valve, a water-inlet member connected to said casing, said water-inlet member having a normally closed water-valve, a fifth device to open said water-valve, said casing also having a drain-valve, a sixth device to open and to close said drain-valve, a loading-device to load said casing with cans, respective control means for said respective devices, and an automatic means to operate said control means in predetermined sequence so as to load the casing with cans, then to close the inlet-valve, then to release the stop bar and to actuate the motor so as to rotate said track-means, then to admit low-pressure steam, then to admit high-pressure steam, then to stop the motor and to move the locking device into operative position for stopping the rotation of said track-means while the supply of high-pressure steam is continued, then to shut off the steam supply, then to admit compressed air and cold water substantially simultaneously, then to release the stop bar and to operate the motor so as to turn said track-means during the admission of the cold water, then to shut off the supply of compressed air, then to shut off the supply of cold water and to stop the motor and to move the stop device into operative position, then to open the drain-valve, and also to intermittently open and to close the drain-valve during the admission of steam or compressed air into the casing so as to maintain the pressure within the casing between a predetermined lower limit and a predetermined upper limit.

3. In a machine for processing a food product which is enclosed in cans, a casing, said casing having therein tracks which are rotatable about a common axis, an electric motor to rotate said tracks, a disc connected to said motor and turnable in unison with said tracks, said disc having a locking-recess, a movable stop-bar, said stop-bar being adjustable to enter said locking-recess and to move out of said locking-recess, means biasing said stop-bar out of said locking-recess, a solenoid to actuate said stop-bar into the locking-recess of said disc when said solenoid is energized, a starter switch to control said electric motor, said starter switch being biased to a normal position in which the supply of power to said electric motor is shut off, the circuit of the solenoid including a first switch and a second switch and a third switch, the first switch and the second switch being biased to normal closing position and the third switch being biased to normal open position, a governor operated by the electric motor to close the third switch when the speed of the electric motor is below a predetermined limit, a first solenoid to open the first switch and to close the starter switch when said first solenoid is energized so as to open the circuit of the solenoid and to start the motor, said first solenoid having a first circuit-locking switch which is closed by said first solenoid when the same is energized, the circuit of the first solenoid which is closed by the closing of the first circuit-locking switch including a first normally closed switch, a second solenoid to open the second switch when said second solenoid is energized, said second solenoid having a second circuit-locking switch which is closed by the second solenoid when the same is energized, the circuit which is controlled by the second switch including a second normally closed switch, automatic means to energize the solenoids and in succession and to open the first normally closed switch and the second normally closed switch in succession, at the completion of a fixed period after the energizing of said solenoids.

4. In a machine for processing a food-product in cans, the sub-combination of a casing, said casing having a steam-supply-member and a water-supply-member and a compressed-air-supply-member, said supply-members having respective supply-valves, said casing also having therein track-means which are rotatable about a common axis, a motor to rotate said track-means, said supply-valves having respective operating-members to open said supply-valves, said operating-members having respective valve-control-means, said motor having a start-and-stop member which controls the supply of power to said motor, said start-and-stop member having motor-control-means therefor, all said valve-control-means and motor-control-means being respectively mounted on a first and a second and a third and a fourth separate and spaced supports, a master control-member which is movable relative to said supports and which is adapted to operate said valve-control-means and said motor-control-means in fixed sequence, the first support having motor-control-means which supply power to the motor when said motor-control-means are actuated by the master control-member, said first support also having the valve-control-means for opening the valve of the steam-supply-member, the second support having motor-control-means to shut off the supply of power to the motor, the third support having the valve-control-means for closing the valve of the steam-supply-member and for opening the valves of the water-supply-member and of the compressed-air-supply-member, the third support also having motor-control-means to supply power to the motor during the admission of water, the third support also having valve-control means for closing the valve of the compressed-air-supply member after water has been supplied during a predetermined period, the fourth support having motor-control-means for shutting off the power-supply of the motor, said fourth support also having valve-control-means for closing the valve of the water-supply-member.

5. A device according to claim 4 in which the distance between the respective first and second supports can be adjusted in order to regulate the time during which the motor is operated while steam is being admitted.

6. A device according to claim 4 in which the respective distances between the third support and the second support and the fourth support can be adjusted in order to regulate the period in which steam is supplied and the cooling period in which water is supplied.

7. A device according to claim 4, having means to move the third support and the fourth support equally and in unison relative to the other supports.

8. In a machine for processing a food-product in cans, a casing having an inlet-valve and an outlet-valve and operating-mechanism to open and to close said inlet-valve and said outlet-valve, said operating-mechanism having control-means, said casing having therein track-means which are rotatable about a common axis, said casing also having a drain-valve and operating-mechanism for opening and closing said drain-valve, said operating-mechanism of the drain-valve also having control-means, said operating-mechanism of the drain-valve having a low-pressure control which sets the operating-mechanism of the drain-valve into operation in order to open said drain-valve when the pressure in the casing is above a predetermined limit and to close the drain-valve when said pressure is below a predetermined limit, said low-pressure control also having control-means, said casing also having connected thereto a steam-supply-member and a water-supply-member and a compressed-air-supply-member, said supply-members having respective supply-valves which are respectively biased to normal closed position, said supply-valves having respective operating-members for opening said supply-valves, said operating-members of the supply-valves also having respective control means, the motor having control-means for controlling the supply of power to said motor, said motor having motor-stop-means for holding said track-means in a predetermined position when said motor is inoperative, said motor-stop-means being biased to normal inoperative position and having operating-means which also have control-means and which can move said motor-stop-means to operative position, all said control-means being mounted on a first and second and a third and a fourth and a fifth separate and spaced supports, a master control member which is movable relative to said supports and which is adapted to operate all said control-means in fixed sequence, said first support having the respective control-means which close the inlet-valve and release the motor-stop-means and supply power to the motor and which admit steam into the casing and which close the drain-valve, said control-means of the first support being located to be operated in the sequence above named, the second support having control-means to shut off the supply of power to the motor, the third support having control-means to shut off the steam supply and to admit compressed air and water and to release the motor-stop-means and to supply power to the track motor and to set the low-pressure control into operation and to shut off the supply of compressed air, the control-means of the third support being mounted so as to shut off the steam supply prior to the admission of water and to admit the air and the water substantially simultaneously and to supply power to the motor during the admission of the water and to release the motor-stop-device before supplying power to the motor, and also to set the low-pressure control into operation substantially with the admission of water, and also to shut off the supply of compressed air after a predetermined quantity of cold water has been admitted, the fourth support having control-means to discontinue the power supply to the motor and to shut off the supply of water and to put the low-pressure control out of operation and to move the motor-stop-means to operative position and to open the drain-valve and to open the outlet-valve, the fifth support having control-means operating first to close the outlet-valve and then to open the inlet-valve.

9. A machine according to claim 8 having mechanism to adjust the third and fourth supports in unison relative to the other supports.

10. A machine according to claim 8 having mechanism to adjust the third, fourth and fifth supports in unison relative to the other supports.

11. A machine according to claim 8 having mechanism to adjust the fourth and fifth supports in unison relative to the other supports.

12. A machine according to claim 8 having mechanism to adjust the first support relative to the other supports and while said other supports are maintained stationary.

13. A machine according to claim 8 having mechanism to adjust the third support relative to the other supports and while the other supports are held stationary.

14. In a machine for processing a canned food-product, a casing, means for feeding the cans which contain the food-product into said casing, means for maintaining said casing closed until the pressure within said casing exceeds a predetermined limit, means for successively admitting low-pressure steam and high-pressure steam into said casing, means for moving said cans within said casing during the admission of the low-pressure steam and during the first portion of the period in which high-pressure steam is admitted and for holding said cans against substantial movement within the casing during the remainder of the high-pressure steam admission-period.

15. In a machine for processing a food product, a casing, said casing having an inlet valve and an outlet valve, first automatic means adapted to open said valves and to close the same, a steam-inlet member connected to said casing and to a source of steam, said steam-inlet member having a steam-valve, second automatic means adapted to open said steam-valve and to close the same, an air-inlet member connected to said casing and to a source of compressed air, said air-inlet member having an air-valve, third automatic means adapted to open said air-valve and to close the same, said casing also having a water-inlet member connected thereto and to a source of water, fourth automatic means adapted to open said water inlet-valve and to close the same, and an automatic control-means adapted to control the operation of said first and second and third and fourth automatic means to first close the inlet valve, while the outlet valve is closed, then to open the steam-inlet valve, then to open the air-inlet valve while substantially simultaneously closing the steam-inlet valve, then to open the water inlet-valve while the air-inlet valve is open, then to close the air-inlet valve and the water-inlet valve, then to open the outlet valve.

16. In a machine for processing a food product, a casing, a steam-inlet member connected to a source of steam and also to said casing, said steam-inlet member having a steam-valve, automatic operating means to open and to close said steam-valve, an air-inlet member connected to a source of compressed air and also to said casing, said air-inlet member having an air-valve, automatic operating means to open and to close said air-valve, and an automatic control-means to control the operation of the air-valve operating means and of the steam-valve operating means, so as to open the air-valve substantially simultaneously with the closing of the steam-valve.

17. In a machine for processing a food product, a casing, said casing having an inlet-valve and a drain-valve, a steam-inlet member connected to a source of steam and also to said casing, a water-inlet member connected to a source of cooling water and also to said casing, an air-inlet member connected to a source of air under pressure and also to said casing, each said inlet-member having a separate valve which is operable either to open or to close the respective inlet-member, each of said previously-mentioned valves having a separate operating mechanism to open and to close the respective valve, each of said operating mechanisms having a separate control device for energizing and deenergizing the respective operating mechanism, a master control member, means to operate said master control member in a fixed path, said respective control devices being located and being spaced from each other in said fixed path and being successively operated by said master control member in a fixed cycle when said master control member is actuated in said fixed path, the aforesaid operating mechanisms being operated in said fixed cycle, first to close the inlet-valve, then to open the steam-inlet-valve while the drain-valve is closed, then to close the steam-inlet-valve while the air-inlet-valve and the water-inlet-valve are opened, then to close the air-inlet-valve and the water-inlet-valve, then to open the drain-valve.

18. A machine according to claim 17 in which said casing has therein a rotatable support for supporting and rotating the food product, a motor to rotate said support, said motor having a plurality of separate motor-control devices for energizing or deenergizing said motor, said motor-control devices being also located in and being spaced from each other in said fixed path and being spaced in said fixed path from the control devices for said valves, said motor-control devices being also consecutively operated by said master control member when it is operated in said fixed path, the first motor-control device being located to be operated to energize the motor after the steam-inlet-valve has been opened and before the steam-inlet-valve is closed, the next consecutive motor-control device being operated to deenergize the motor before the steam-inlet-valve is closed so that the support ceases its rotation before the steam-inlet-valve is closed, and the next motor-control device being operated to energize the motor when the water-inlet-valve and the air-inlet-valve are opened.

19. A machine according to claim 17, including a safety-device which is biased to an operative safety position in which said safety-device prevents the opening of the separate and respective valves of the steam-inlet-member and the water-inlet-member and the air-inlet-member, safety-device operating means to move said safety-device to an inoperative position in which it permits the opening of the separate valves of the steam-inlet-member and the water-inlet-member and the air-inlet-member, said safety-device operating means being actuated to move said safety-device to said inoperative position, simultaneously with the closing of the inlet-valve.

20. A machine for processing a food product in cans, comprising a casing, said casing having a drain-valve connected thereto, an inlet-valve located at the inlet end of the casing, an outlet-valve located at the outlet end of the casing, said casing having an axis which is downwardly inclined from its inlet end to its outlet end, track-means located in said casing and rotatable relative to the casing around the axis of the casing, a steam-inlet-member connected to a source of steam and to said casing, a water-inlet-member connected to a source of water and to said casing, an air-inlet-member connected to a source of air under pressure and to said casing, a motor to rotate said track-means, a stop-device for the track-means, said stop-device being movable in unison with said track-means, a movable stop-member which is movable to an operative position in which said stop-member engages said stop-device to stop the rotation of said track-means when said track-means are in a predetermined position, said movable stop-member also being movable to an inoperative position in which it releases said stop-device, biasing means to bias said stop-member to its inoperative position, said steam-inlet-member and said water-inlet-member and said air-inlet-member having separate control-valves, separate valve-operating devices to respectively open and close said control-valves and to open and close said drain-valve and to open and to close said inlet-valve and to open and to close said outlet-valve, power-control means to control the supply of power to said motor, actuating-means to move said stop-member to said operative position, separate control devices for said respective valve-operating devices and said power-control means and said actuating-means, and an automatic mechanism for operating said control devices in fixed cycle, first to close the inlet-valve while the drain-valve is open, then to deenergize said actuating-means so that said stop-member is free to move to its inoperative position under the force of said biasing means, then to operate said power-control means so as to supply power to said motor, then to open the control-valve of the steam-inlet-member while the drain-valve is open and while the motor is supplied with power, then to close the drain-valve while the control-valve of the steam-inlet-member remains open, then to close the control-valve of the steam-inlet-member, then to open the control-valves of the water-inlet-member and of the air-inlet-member, then while the motor is supplied with power, to close the control-valves of the air-inlet member and of the water-inlet-member, then to open the drain-valve.

21. A machine according to claim 20 in which the automatic mechanism comprises a rotatable member and means adapted to rotate said rotatable member at predetermined constant speed.

HARRY L. GRIFFIN.
ALEXANDER R. ROBB.
ROLLA W. TITUS.
HANS T. GEBHARDT.